United States Patent
Gouldson et al.

(12) 
(10) Patent No.: US 6,484,390 B1
(45) Date of Patent: Nov. 26, 2002

(54) APPARATUS FOR REUSING HANGERS WITH SIZE INDICIA

(75) Inventors: Stanley F. Gouldson, Northport, NY (US); Glenn Zimmerman, Arden, NC (US)

(73) Assignee: Spotless Plastics Pty. Ltd. (AU)

( * ) Notice: Subject to any disclaimer, the term of this patent is extended or adjusted under 35 U.S.C. 154(b) by 0 days.

(21) Appl. No.: 09/215,957

(22) Filed: Dec. 18, 1998

Related U.S. Application Data

(63) Continuation-in-part of application No. 08/646,995, filed on May 9, 1996.

(51) Int. Cl.[7] ............................................... B23P 19/00
(52) U.S. Cl. ......................................... 29/700; 29/403.1
(58) Field of Search ........................... 29/407.01, 426.1, 29/426.3, 426.6, 453, 527.1, 403.1, 700, 771, 791, 650; 223/85; 40/322; 264/36.1

(56) References Cited

U.S. PATENT DOCUMENTS

| | | |
|---|---|---|
| 4,322,902 A | 4/1982 | Lenthall |
| 5,272,806 A | 12/1993 | Marshall et al. |
| 5,285,566 A | 2/1994 | Marshall et al. |
| 5,388,354 A | 2/1995 | Marshall et al. |
| 5,507,086 A | 4/1996 | Marshall et al. |
| 5,558,280 A | 9/1996 | Morgan |
| 5,785,260 A | 7/1998 | Morgan |

FOREIGN PATENT DOCUMENTS

| | | |
|---|---|---|
| EP | 0 512 225 A2 | 11/1992 |
| GB | 1524878 | 9/1978 |

OTHER PUBLICATIONS

Waste Management: Rethinking and Recycling at p. 45 (source unknown, date unknown but prior to Jan. 1996).
Brauer, David, "Recycled Truth" Twin Cities Reader (date unknown but believed to be around Apr. 1994).
Biddle, David, "Recycling for Profit: The New Green Business Frontier" Harvard Business Review, Nov./Dec. 1993, pp. 145–156.
Retailers reduce waste with hanger recycling. Chain Store Age Executive with Shopping Center Age, v73, nl, p182(1) Jan., 1997.
Recycling is no longer a hang–up, Material Handling Engineering, v52n3 PP:61 Mar. 1997.

*Primary Examiner*—David P. Bryant
(74) *Attorney, Agent, or Firm*—Scully, Scott, Murphy & Presser

(57) ABSTRACT

The specification discloses a system, method and apparatus for re-using garment hangers with size indicia mounted thereon. The method provides a closed loop for re-using the garment hangers by shipping hangers and the size indicia to clothing manufacturers, assembling the hangers with the size indicia and also hanging garments thereon, grouping the hangers with size indicia and garments thereon into batches which are then sent to retail stores for display and sale, at the point of sale removable a percentage of the hangers from the clothing and returning them to a reuse center where the size indicia is removed and the hangers cleaned before the hangers are returned to the clothing manufacturers to repeat the process. The supply of hangers may be augmented with newly molded hangers to maintain a constant and adequate supply for the clothing manufacturers.

16 Claims, 16 Drawing Sheets

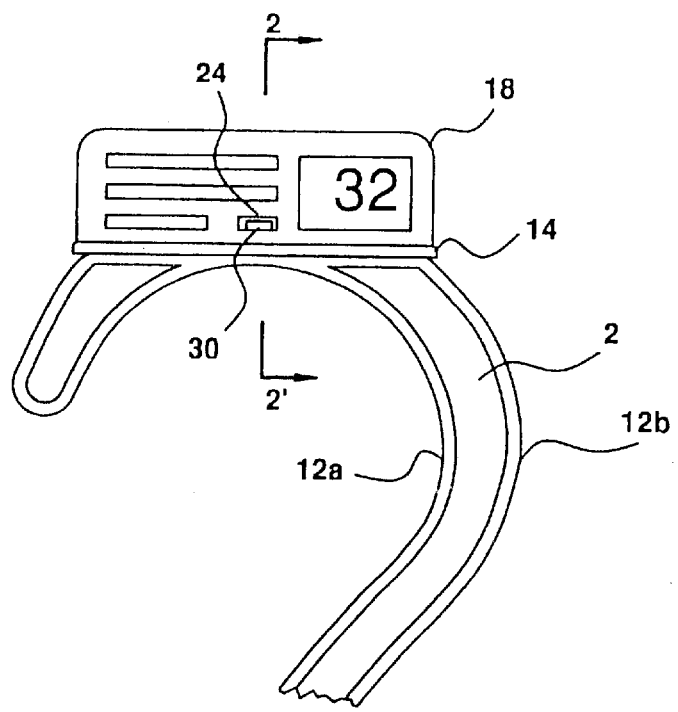
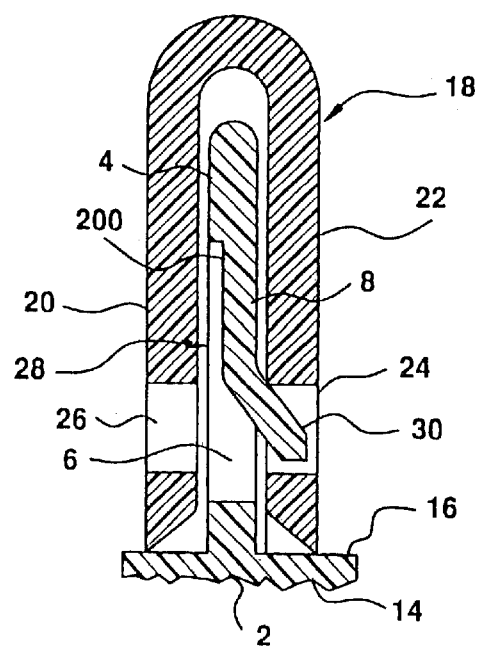

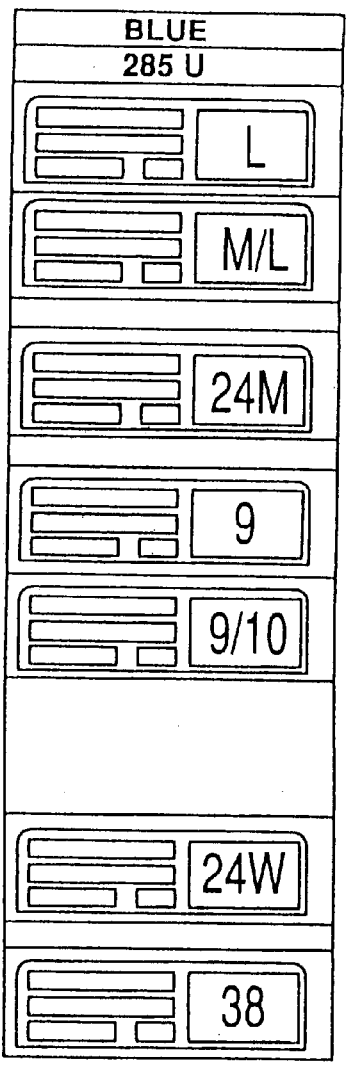

FIG.6A

| ROW | COLUMN DESCRIPTION | 1 LEMON 101 U | 2 PINK 189 U | 3 AQUA 326 U | 4 RED 192 U | 5 TAN 145 U | 6 YELLOW 121 U |
|---|---|---|---|---|---|---|---|
| A | UNIVERSAL | | XXS | | XS | | S |
| B | Tall/Multi | | | | | | |
| C | INFANT/ TODDLERS | | NB | | 6M | 9M | 12M |
| D | METRIC | | 3 | 2 | 4 | | 5 |
| E | Multi-sizes | | 3/4 | | | | 5/6 |
| F | Plus-sizes | | 16W | | 18W | | 20W |
| G | WAIST (imperial) | 27 | 28 | 29 | 30 | 31 | 32 |

FIG.6B

| 7 | 8 | 9 | 10 | 11 | 12 | 13 |
|---|---|---|---|---|---|---|
| LT-BLUE 306 U | GREEN 340 U | SKY 2975 U | PURPLE 2715 U | OLIVE 398 U | BLUE 285 U | ORANGE 165 U |
|  | M |  |  |  | L |  |
|  | S/M |  | 1 SIZE |  | M/L | LT |
|  | 18M |  |  |  | 24M | 36M |
|  | 7 |  | 8 |  | 9 | 10 |
| 6 | 7/8 |  |  |  | 9/10 |  |
|  | 6X/7 |  |  |  |  |  |
|  | 22W |  |  |  | 24W |  |
| 33 | 34 | 35 | 36 | 37 | 38 | 40 |

FIG.6C

| | 14 | 15 | 16 | 17 | 18 | 19 | 20 |
|---|---|---|---|---|---|---|---|
| | PURPLE 2593 U | LT GREEN 375 U | BUR/G 246 U | YELLOW 101 U<br>Color repeat >>>>> | AQUA 326 U | TAN 145 U | SKY 2975 U |
| | XL | | | | | | |
| | L/XL | XLT | XXL | XXLT | XXXL | | |
| | 2T | | 3T | | 4T | | 5T |
| | 11 | 12 | 13 | 14 | 15 | 16 | 18 |
| | 11/12 | | 13/14 | | 15/16 | | |
| | 26W | | | | | | |
| | 42 | 44 | 46 | 48 | | | |

APPARATUS FOR REUSING HANGERS WITH SIZE INDICIA

CROSS-REFERENCE TO RELATED APPLICATION

This application is a continuation-in-part of U.S. Ser. No. 08/646,995, filed May 9, 1996 entitled METHOD FOR REUSING HANGERS WITH SIZE INDICIA.

FIELD OF INVENTION

The present invention is directed to the field of garment hangers and is more particularly directed to a method apparatus and system for reusing hangers with size indicia mounted thereon.

BACKGROUND OF INVENTION

An article of clothing typically includes one or more labels located somewhere inside of the clothing article. The label usually includes size, fiber content and manufacturer details as well as information relating to country of origin and care instructions. In addition, a tag is attached to the article of clothing identifying the price of the garment as well as size. The tag often includes additional information relating to the store name, manufacturer and possibly a bar code which when scanned provides such information.

In some cases a particular retailer or garment manufacturer has attached a further tag to the garment which bears a design that is in part colored to permit sorting according to some attribute of the garment such as style, color or size. For instance, the portion of the design that is colored may be blue to indicate a women's size 6 or green to indicate a women's size 8 or blue to indicate a men's size 44 or green to indicate a men's size 48. When such information is included on the tag attached to a garment, the consumer or retailer need not review the label of each item of clothing but merely locate the appropriately colored tag.

However, tags are often attached to either the front, back or sleeve of the garment and thus, are not readily visible to either the retailer or the consumer. The retailer or consumer must rifle through the garments on the rack to locate the tags with the pertinent information. If the garment is not hung on a rack but folded in stacks (as is typical with sweaters and jeans) the tags are often tucked inside the garment for purposes of a neater display, thus, it is necessary to unfold the garment to find the appropriate information.

Furthermore, there is virtually no uniformity between manufacturers and/or retailers as to the designation of the desired attribute of the clothing. For instance, the color blue may mean size 6 for one manufacturer or retailer but size 12 for another. Thus, the consumer is not aided by the color designation when visiting different areas of the store. Further, blue may refer to large in a men's jacket size but medium for men's slacks.

For purposes of displaying garments suspended on hangers in an orderly and attractive manner to the retail customer, it is often desired to affix an indicating means on the hanger in a position visible to the retail customer while the hanger is suspended on a rack. The indicating means identifies some attribute of the garment suspended from the hanger, such as size, quality, color, manufacturing data, or pattern.

The provision of a readily visible size indicator on a garment hanger is now accepted by retailers as a desirable addition to a garment hanger. To accommodate the various types of hangers available in the industry numerous indicating means have been developed in a variety of shapes, sizes and materials. Similarly, hangers have been developed to accommodate a variety of different indicating means.

In Australian Patent No. 638436 and corresponding U.S. Pat. No. 5,388,354, assigned to the assignee of the present invention, a low-profile molded plastic indicator for a garment hanger which requires limited modification to the hook of the hanger to enable the indicator to be securely attached to the top of the hook where it is most visible is described. The indicator is also designed to enable sorting into a predetermined orientation to enable automated handling and fitting of the indicators to hangers as described in U.S. Pat. Nos. 5,272,806 and 5,285,566 which are assigned to the assignee of the present invention.

Such hangers and indicia are typically used only a single time and then shipped to either a landfill as waste or a recycling center where the plastic hangers are granulated into pellets which are then resold.

However, landfills are taking up more and more space and recycling is often an expensive venture which renders such an option cost inefficient despite the need to conserve our environment's resources. Furthermore, many companies do not want to purchase recycled-content plastic products for either safety (i.e., food containers) or aesthetic purposes.

SUMMARY OF INVENTION

Accordingly, it is an object of the present invention to provide an apparatus and method for reusing hangers having size indicia removably mounted thereon wherein plastic hangers used to display garments in a retail store are re-used several times before being shipped as waste or recycled.

More particularly, the apparatus and method of the present invention comprises:

(a) molding a first plurality of hangers with reuse enhanced properties, and then shipping the hangers to a plurality of clothing manufacturers at scattered geographic locals;

(b) shipping a plurality of removable size indicia to the plurality of clothing manufacturers at the scattered geographic locals, the removable size indicia adapted to be removably secured to the first plurality of hangers;

(c) assembling one hanger from said plurality of hangers with a garment and one of the removable size indicia, wherein the size indicia represents the size of the garment and the size indicia is preferably attached to the hanger automatically;

(d) batching a plurality of the hangers with garments suspended therefrom and size indicia mounted thereon and then shipping the batch to a retail outlet for display and sale of the garments;

(e) removing a definable percentage of the hangers with the size indicia mounted thereon from the garments as said garments are sold, and returning the defined percentage of hangers with size indicia to a reuse center;

(f) removing the size indicia from the hangers at the reuse center and inspecting the hangers to obtain a plurality of selected hangers for reuse, wherein the removal of the size indicia from the hanger is preferably performed by automated removal; and (g) cleaning the plurality of hangers selected for reuse to recondition the same for reuse; and (h) augmenting the selected hangers with newly molded hangers to provide the first plurality of hangers and repeating step (a) to form a loop for reused hangers.

The method of the present invention particularly addresses environmental concerns to reduce plastic waste by reducing the overall number of plastic garment hangers being manufactured.

The first plurality of hangers is molded and shipped to numerous clothing manufacturers in a variety of geographic locals throughout the world. In a preferred embodiment batches of the removable size indicia, which correspond to the hangers in the first plurality of hangers, are molded from plastic and then shipped to the various clothing manufacturers. The batches are typically molded by size and color to form batches of color coded size indicia in a plurality of different colors. In a preferred embodiment the batches of color coded size indicia are bundled into stacks and automatically attached to the hangers. To ensure color uniformity the color coded size indicia can be molded at a single location. Each size indicia is mounted on a hanger from which a garment is also suspended such that the size of the garment corresponds to the size indicia.

Groups of hangers with size indicia mounted thereon and garments suspended therefrom are organized according to a retail store's order and then the batch of hangers with size indicia and garments are shipped to a retail store or retail distribution center for display and sale of the garments. Such garments are floor ready meaning that the garment can literally go from the packing box to the rack for display. Much of the back room sorting, sizing and pricing is eliminated. Because the garments arrive at the store already hung on hangers, the number of hangers the store is required to store is also vastly reduced. It will be noted that when the hangers with garments and size indicia may be shipped to a retail distribution center, the center then forwards the appropriate number of such items to the appropriate retail store.

In the present method as the garments are sold in the retail store the hangers with size indicia are removed from the garments and separately packaged for return shipment to a reuse center. The number of hangers set aside for reuse is a definable percentage taking into account that some customers will request that they be permitted to keep a hanger at the point of sale and that hangers may be inadvertently damaged, thrown out or kept by a store. In a preferred embodiment the definable percentage of hangers removed for reuse is 65% to 90%. It has been found that about 10% to 35% of the hangers identified as the first plurality of hangers will be unrecoverable.

At the reuse center the size indicia are automatically removed from the hangers and the hangers are inspected for damage or other contamination. The non-damaged and non-contaminated hangers are selected for reuse. It is contemplated that about 10–30% of the returned hangers will be unrecoverable which means that in a preferred embodiment the number of hangers selected for reuse constitutes about 50% to 80% of the first plurality of hangers originally molded and sent to the garment manufacturers. In a preferred embodiment the hangers not selected for reuse are ground into pellets and either recycled or sold as scrap plastic. In a preferred embodiment the recycled plastic is ground, fed into a hopper and melted down in a barrel extruder to form a molten plastic which is then injected into a mold machine to form recycled plastic hangers for retail consumer usage. The consumer grade hangers are then returned to the retail store for sale.

The hangers which are selected for reuse are returned to garment manufacturers and batched with newly molded hangers to repeat the present process. Statistical averages indicate that a hanger will complete 2 to 6 loops of reuse before being considered unrecoverable. Typically the hangers are cleaned before being returned to the garment manufacturers for reuse.

Since fewer than 100% of the hangers are reused it is necessary to augment the supply of hangers being reused with newly molded hangers in order to maintain a constant adequate supply. In the preferred embodiment the supply of selected hangers is augmented with about 20 to 50% of the number of the first plurality of hangers. However, the number of overall hangers which are molded is less than if there was no reuse.

In yet another embodiment the present invention contemplates the reuse of the color coded indicia. Accordingly, the present method further includes the steps of sorting the removed size indicia from the hangers by color. If different size designations are utilized for the same color coded size indicia then a secondary sort by size must also be completed. The sorted size indicia would then be bundled and shipped to the garment manufacturers for mounting on hangers. In a preferred embodiment the method further includes the step of washing the color coded size indicia.

BRIEF DESCRIPTION OF THE FIGURES

The foregoing and other objects of the invention may now be more readily ascertained from the following detailed description of the preferred embodiments thereof, taken in conjunction with the accompanying drawings, in which:

FIG. 1 illustrates a hanger hook with a color coded size cap mounted thereon that is useful in the practice of the present invention;

FIG. 2 is a cross section taken along section lines 2–2' of FIG. 1 which illustrates the interior construction of the hanger and hook combination illustrated in FIG. 1;

FIG. 3 is an illustration of a common color code assigned to various sub-sets of the plurality of graded size, as determined by large scale consumer demographics;

FIG. 4 is an illustration of one set of common size designations illustrating a sub-set of the plurality of graded sizes of the present invention;

FIGS. 6(a), 6(b) and 6(c) are three drawings, which when combined as indicated thereon, illustrate one representative example of a color code scheme of the present invention;

DETAILED DESCRIPTION OF THE INVENTION

Figure 5:
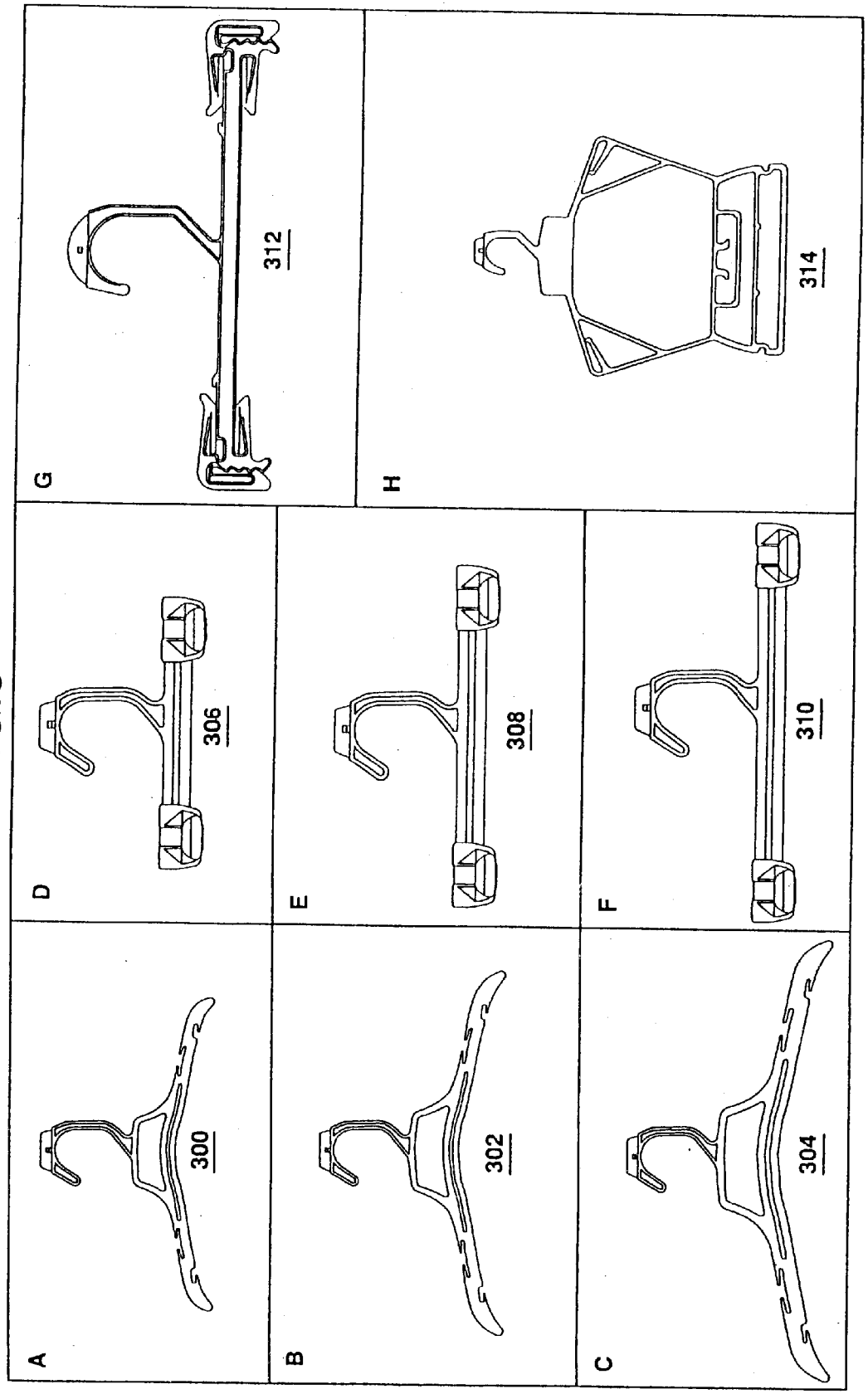
FIG. 5 is an illustration of one family of hanger designs that may be used throughout a retail clothing store to uniformly display the articles of clothing for sale, and to display the color codes of the present invention.

Referring now in detail to the drawings, and to the embodiments depicted in FIGS. 1 and 2, there is illustrated a hanger hook 2 with a color coded size cap 18 mounted thereon that is useful in the practice of the present invention. The hook 2 of a molded plastic garment hanger is shown in simplified form and is adapted to engage a rod or other supporting means. In practice the hook typically includes the strengthening ribs 12a, 12b around the perimeter of the hook. It will be noted that in FIGS. 1 and 2, the body and clips of the hanger are not depicted. The body and clip structure of the hanger can take on many different types of configurations as long as the hanger supports the garments suspended thereon. In FIG. 5, several exemplary hanger styles which will accommodate a variety of types of clothing are depicted. Each of the hangers shown in FIG. 5 includes a means for attaching a color coded size cap 18.

The color coded size cap 18 which is mounted on the hanger is more clearly illustrated in FIG. 2. As shown therein the size cap includes side walls 20, 22 formed with at least one retention aperture 24, 26, as described in Australian Patent No. 638436 and U.S. Pat. No. 5,388,354, the contents of which are incorporated into this specification by cross-reference. The apertures 24, 26 define through-openings which facilitate stacking of the indicator 18 with other indicators prior to fitting to a hanger.

The indicator is retained on the hook by an indicator attachment mechanism. As illustrated in FIGS. 1 and 2 the hook 2 is formed with a flange 14 defining a top region 16, which in a preferred embodiment is flattened and slightly larger in peripheral dimensions than the lowermost portion of an indicator 18. An upstanding web 4 extends centrally from the top region 16 of the hook 2. The web 4 can be shaped similarly to the shape of the cavity of the indicator 18 so as to comfortably fit within that cavity. As one alternative, the web 4 can be shaped to follow the normal contour of the hanger hook.

The web 4 is formed with integrally molded indicator attachment means 28. In the present embodiment the indicator attachment means includes central opening 6 from the upper portion of which a resilient detent leg 8 extends downwardly terminating in a laterally projecting portion 30 configured to engage one of the apertures 24 or 26 in the side wall of the indicator 18, as shown in FIG. 2.

Since the detent leg 8 is narrow and is resiliently connected to web 4, it is easily deflected laterally by means of a probe or pin inserted into the aperture 24 or 26 which engages laterally projecting portion 30 to displace laterally projecting portion 30 toward the plane of the web to clear the aperture 24 or 26 and allow the indicator to be removed from the web 4. This operation can be achieved simply and quickly with little or no damage to the indicator 18 or the attachment means 28. Nevertheless, while the laterally projecting portion 30 remains in the position shown in FIG. 2 of the drawings, the indicator 18 will remain securely fastened to the web 4 and will withstand all usual handling operations to which the hanger is subjected in day-to-day use.

To improve the flexibility of the detent leg 8, it can be reduced in thickness as shown at 34 in FIG. 2 of the drawings.

Other means for attaching indicators to hangers can be utilized, such as the means described in U.S. Pat. No. 5,388,354, wherein the indicator may also be retained on the hook by means of at least one abutment projecting from the hook which engages an aperture in the side wall of the indicator. However, when the indicator is retained by an abutment, the indicator is not easily removed from the hanger and either the hanger or the indicator may be damaged during the process.

In the preferred embodiment of the present invention the size cap shown is of a rectangular configuration, see for example, FIGS. 1 and 3, and presented at the top of the hook. However, other shapes and configurations of size caps can be used in accordance with the present invention.

The indicator 18 of the preferred embodiment has been particularly well-received by retailers and consumers in the method and system for color coding sizes of clothing on display which is also useful in the practice of the present invention.

In the present method and system, individual articles of clothing are classified according to line, such as men's apparel, women's apparel, infant and toddler apparel, youth apparel, girl's apparel, boy's apparel, intimate apparel, men's apparel sized by waist, women's apparel sized by waist, petite apparel and plus apparel. Each line of clothing is then further classified according to type of clothing. For instance, further classification in the women's line includes dresses, shirts, blouses, skirts, slacks, suits, sweaters, coats, jackets, panties, bras, and bathing suits.

Each of these lines of clothing is then segregated into a plurality of graded sizes with a plurality of common size designations that appear in all of the clothing lines. Common size designations may include XXS (extra, extra-small), XS(extra-small), P/S (petite/small), S(small), S/M (small/medium), M(medium), M/L(medium/large), L(large), L/XL (large/extra-large), XL(extra-large), XXL(extra-extra-large) and XXXL (extra-extra-extra large). Of these designations S, M, L and XL are almost universally available. Each of these common size designations designates clothes intended to fit consumers of a particular physiology.

In some situations, typically, when the clothing is more tailored, a more specific size designation is required and the size designations are referenced by numerals such as 2, 4, 6, 8, 10, 12, 16, 18 and 20; 1, 3, 5, 7, 9, 11 and 13; or 3/4, 5/6, 7/8, 9/10, 11/12, 13/14 and 15/16, which would appear in numerous clothing lines.

The particular graded sizes in different clothing lines that would be selected by a consumer selecting clothing appropriate for a particular physiology is then identified and a color code assigned to each graded size designation to form a matched set of graded sizes common to a specific consumer profile. The clothing is displayed on a hanger with a color coded size cap mounted thereon such that the color of the size cap conforms to the assigned color code.

For instance, in the color coding system illustrated in FIG. 3, the color blue has been assigned 7 different size designations: L, M/L, 24 M, 9, 9/10, 24 W and 38. As indicated by the sizes matched in this set, the blue color indicates a large size clothing. In women's apparel, the sizing used in different lines of clothing would typically be L or M/L and 9 or 9/10 to designate a particular physiology profile. A women of this physiology would know by using the color coding method and system of the present invention that she could look for garments hung on a hanger with a blue size cap to find clothes that matched her physiology.

In infant's apparel the sizing would typically be either large or 24 months both of which identify garments that would fit an infant of a particular physiology. Thus, the consumer could then look for garments hung on hangers with a blue size cap to find appropriate garments.

It will be noted that the same color designating the larger sized clothing in the women's apparel line is used to designate the larger sized clothing in the infant apparel line. This system can be followed in garments sized by waist, where for instance the blue color indicates a 38 waist and also in the plus-sized apparel to designate a 24 W, where the plus-sized line of clothing runs from size 16 W to 26 W. This system permits the purchaser to move from department to department of a retail store and find articles of clothing appropriate to fit a particular physiology based on the color coding of the sizes. Furthermore, this same consumer can make purchases for others knowing only the bare basics of the recipient's physiology.

FIG. 4 illustrates one set of common size designations showing a subset of the plurality of graded sizes of the present invention wherein:

lemon designates XXL purple designates XL or L/XL blue designates L or M/L green designates M yellow designates S pink designates XXS.

A different color designates each graded size in this universal system of sizing. It will be noted that there are two size designations for purple and blue. This is possible because a single manufacturer of clothing would not typically use both forms of sizing for the same type of garment. However, both forms of sizing may be found in a single classification of clothing. By designating all clothing that can fit a specifically sized person with a single color the consumer then easily knows to look for that color size cap when selecting clothing on display.

FIG. 5 illustrates one family of hanger designs that may be used throughout a retail clothing store to uniformly display the articles of clothing for sale and to display the color codes of the present invention. Hangers 300, 302 and 304 are typically used to hang tops such as shirts, blouses, dresses, coats, jackets, robes, nightgowns, rompers, overalls, swimwear and sweaters. Hanger 300 which is 12 inches long can be used to hang infant and toddler tops, hanger 302 which is 14 inches long can be used to hang kids tops and hanger 304 which is 17 inches long can be used to hang adult tops. Hangers 306, 308 and 310 are typically used to hang bottoms such as slacks, denims and skirts. Hanger 306 which is 8 inches long can be used to hang infant and toddler bottoms, hanger 308 which is 10 inches long can be used to hang children's bottoms and hanger 310 which is 12 inches long can be used to hang adult bottoms. Hanger 312 can be used to hang bras, panties, slips and bathing suits. A hanger body length of about 10 inches is preferred to accommodate a variety of different sizes. Hanger 314 is a frame hanger which can be used to hang infant and toddler separates and coordinates. The varying lengths of hangers 300–310 accommodate virtually all of the different lines of clothing ranging from infants to plus sizes.

Each of these hangers includes an indicator attachment mechanism as described previously herein to display the color coded size caps described herein at the top of the hook. Typically a retail store utilizes many different hanger designs depending upon the type of garment and the manufacturer. Limiting the number of hangers used throughout the store to about eight different designs is an extremely cost-effective maneuver which will also standardize the display and result in a neater appearance. However, it will be noted that the eight designs of FIG. 5 constitute a preferred embodiment of the present invention. Any hanger with an indicator attachment mechanism suitable for receiving a color coded size cap can be used in the method and system of the present invention.

FIGS. 6(a), 6(b) and 6(c) illustrate one representative example of a color code scheme of the present invention which can accommodate the sizing needs of all lines of clothing and departments in a large retail store.

At the far left of FIG. 6(a) designated as Rows A–G are a plurality of size classifications which would be appropriate for a plurality of clothing lines are designated as universal, tall/multi, infant or toddlers, metric, multi-sizes, plus-size and waist sizes. It will be noted that more than one size classification may be found in a single line of clothing. For instance, in women's apparel, clothing may be sized in universal sizes (Row A), metric sizes (Row D) (typically, odd numbers, even numbers or multi-sizes), plus sizes (Row F) or by waist (Row G).

To the right of each class designation in each row is a series of graded size designations appropriate for each class. The size designations are based on large scale consumer physiological demographics, so that in identifying the graded size for an item of clothing sized by a waist size, the size identified is common to the graded size of an item of clothing sized by chest size or universal size for the same consumer physiological profile.

The particular graded sizes in different clothing lines that would be selected by a consumer for a specified physiological profile are set forth in columns each of which are assigned a color. Each color designates a specific size which will fit a consumer of a particular physiological profile. The color coded size cap mounted on the hanger (such as any hanger depicted in FIG. 5) from which the garment is suspended can be used to determine which clothing on display is to be selected to form a matched set of graded sizes common to a specific consumer physiology.

About 16 different colors are needed to differentiate between all of the different sizes. One family of colors is set forth in FIG. 6 in Columns 1–20, which includes: lemon (Pantone 101 U), pink (Pantone 189 U), aqua (Pantone 326 U), red (Pantone 192 U), tan (Pantone 145 U), yellow (Pantone 121 U), light blue (Pantone 306 U), green (Pantone 340 U), sky blue (Pantone 2975 U), light purple (Pantone 2715 U), olive (Pantone 398 U), blue (Pantone 285 U), orange (Pantone 165 U), dark purple (Pantone 2593 U), light green (Pantone 375 U) and burgundy (Pantone 246 U). Colors can be reused in different lines of clothing where the sizes do not overlap but still typically designate either a larger, smaller or medium size.

For instance in the present embodiment it will be noted that the colors yellow, aqua, tan and sky blue have been used more than once in designating a physiological profile. Using the color aqua (Columns 3 and 18) as an example, the sizes 2 and waist 29 designate one physiological profile, while XXXL, 15 and 15/16 designate a completely separate physiological consumer profile. There would be no overlap in the lines of clothing sought by individuals between these two size groups. The size 4T is also designated by the color aqua. Again this size does not overlap with either of the other two size groups which renders it permissible to reuse the color in the toddler line. Also it is noted that the size 4T is one of the largest toddler sizes bringing the use of the color in line with its larger size designation. When a color is used to designate a multitude of sizes in nonoverlapping lines of clothing it will not be a color used to designate one of the more common sizes such as S, M or L.

However, typically a color will only be used once to designate a single physiological profile. More than 70% of all size caps will fall into one of five colors that designates the physiological profile for the following universal sizes: XS, S, M, L and XL and the corresponding size classes designated by row. To enhance the visibility of these size caps for these most common sizes the size caps are assigned the brightest and most basic colors, respectively red, yellow, green, blue and purple.

Blue for instance designates a large size in the present embodiment as discussed previously with respect to FIG. 3. Yellow designates the size small. Corresponding to this physiological profile for a women's line of clothing are the sizes S, 5, 5/6, and waist 32. Clothes marked with these sizes would all fit a women of a particular physiological profile. The sizes S and 12M also would fit an infant of a particular physiological profile and the size 20 W is considered to be a small plus-sized garment. Accordingly, attaching a yellow size cap to the hangers from which each of these garments are suspended would enable a consumer to match up all the different clothes from numerous clothing lines and by numerous manufacturers which fit a particular physiology identified as being small. Thus, the consumer could move from department to department reviewing numerous lines of clothing from slacks, to suits, to coats, to dresses, to intimate apparel and find the size appropriate for that consumer's particular physiological profile. The consumer would even recognize the color as designating a particular size profile in other lines of clothing, such as an infant or men's apparel.

By placing a color coded size cap at the top of each hanger the consumer is greatly aided in locating all garments designed to fit a particular physiological profile in numerous different departments from different clothing lines no matter how the garment is sized, universally or metrically. This also aids the salesperson who is assisting the consumer in looking for a particular garment either on the floor of the store as well as in the back rooms of the store where any additional garments are stored, replenishing a rack of clothing, organizing a rack of clothing according to size or re-organizing a rack of clothing by size at the end of the day.

It is also contemplated that in the preferred embodiment of the system of the present invention the color coded size caps and the garments are assembled at the point of manufacture and arrive at the store already on the hanger. This means that the actual matching of the color coded size cap and an article of clothing takes places before shipment of the garment from the manufacturer. The garment arrives at the retail store, floor ready. The prehung color coded sized garments need only be removed from a box and hung on the rack. Most of the typical back room work in a retail store is eliminated, thus making the system of the present invention extremely cost-efficient. In a preferred embodiment, the attachment of the color coded size cap to the hanger is performed automatically at the time the garment is hung. Although the attachment could also be by manual means.

Figure 7:
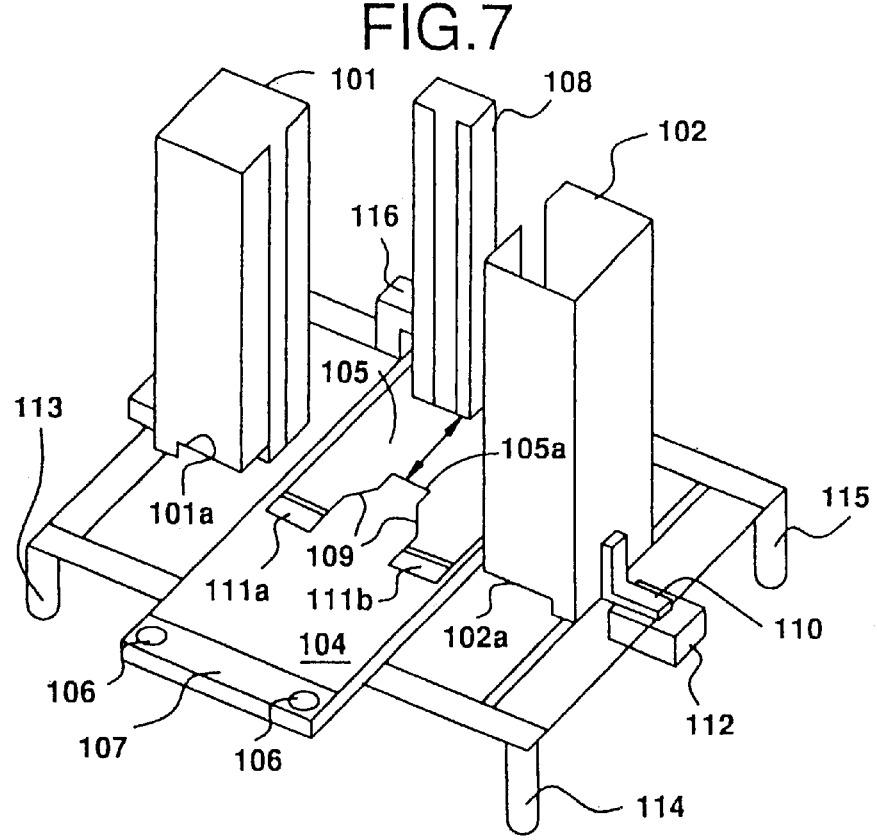
FIG. 7 is an isometric view of a mechanism useful in the automatic assembly of the color coded index caps and hangers of the present invention.
Figure 8:
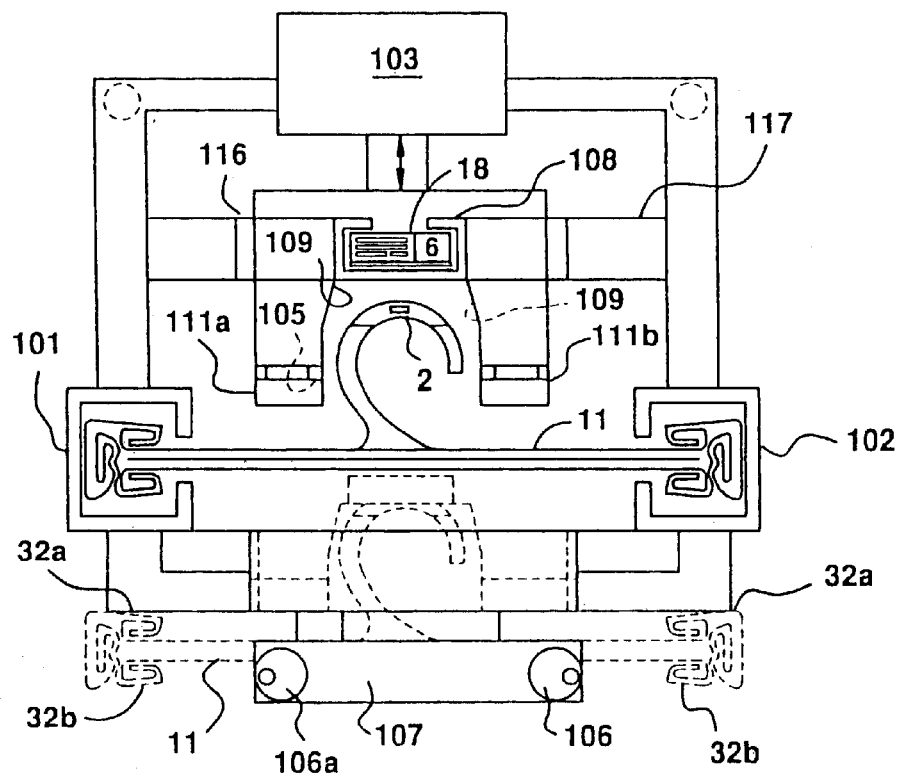
FIG. 8 is an plan view of the mechanism shown in FIG. 7 illustrating the assembly of a color coded index cap to a hanger as taught by the present invention.

One such means for automatically attaching a color coded size cap to hanger is illustrated in FIGS. 7 and 8 and is more specifically described in U.S. Pat. Nos. 5,272,806; 5,285,566 and 5,507,087, the contents of which are incorporated herein by reference. It will be noted that each of these patents is assigned to the assignee of the present invention. In the illustrated embodiment of a system for attaching an indicator to a hanger, the attaching means includes a pair of magazine towers 101 and 102 dimensioned to contain a vertical stack of hangers therebetween and a third magazine 108 which receives a bundle of stacked indexing caps. The hangers rest on platen member 104 and are selectively engaged by a reciprocating plate 105 which includes a cutout 105*a* conforming to the exterior dimensions of the index coded cap 18.

Immediately adjacent cut-out 105*a* are alignment cams 109. The ends 111*a*, 111*b* of reciprocating plate 105 provide a spring loaded tip for engagement of the hanger 11. In addition, the magazines 101 and 102 are independently adjustable by means of bracket 110 and support 112 to configure the system to a wide variety of hanger shapes including those depicted in FIG. 5. Each of the magazines 101, 102 and 108 have cut-outs 101*a*, 102*a* which allow the hangers and index caps to be withdrawn from the magazines as plate means 105 reciprocates forwardly as illustrated in FIG. 7. Stand-off legs 113–115 are used to elevate the system above the employee work bench, to assist the operator in draping the article of clothing about the hanger before the hanger is withdrawn from the system. Alternately, the individual legs can be altered in length to provide a slanted configuration which will facilitate hanging clothes therefrom.

As illustrated in FIG. 8, the system is loaded with a bundle of stacked caps indicated at 18 which are loaded into magazine 108. Magazine 108 is suspended above the reciprocating plate 105 and platen 104 by brackets 116, 117. Prior to engagement with the hanger 11 the spring loaded tips 111*a*, 111*b* of reciprocating plate 105 are fully distended. As plate 105 moves forward, or downwardly as illustrated in FIG. 8, it first engages an index cap from the stack of caps 18 within recess 105*a*. The alignment surface 109 centers the hook 2 within the reciprocating plate 105 so that the indicator attachment mechanism on the hook is properly aligned with the index cap 18 during attachment. Plate 105 is dimensioned such that the index cap is seated on hook 2 by the impact of plate 105 as the floating spring loaded tips 111*a*, 111*b* engage the center portion of hanger 11. The hanger is then driven forwardly out of the magazines 101, 102 to the position illustrated by the dotted lines in FIG. 8.

The hanger engages eccentric stops 106*a*, 106*b* and displaces the end portion of platen 104 outwardly as illustrated in FIG. 8. The spring loaded tips 111*a* and 111*b* compensate for irregularities in hanger molding and reduce the impact of the reciprocating plate 105 on the central portion of the hanger. This substantially eliminates the broken and shattered hangers normally encountered in this type of device. As the pneumatic cylinder 103 drives platen 104, the spring loaded tips 111a, 111b are compressed, and the spring loaded platen 107 is between platen 104, and platen 107. As illustrated in FIG. 8, the hanger is now presented to the operator with the clips 32a–32b suspended above the work space and free from any immediately adjacent encumbrances, so that the operator may quickly and easily attach a garment thereto. As the article of clothing is attached to the hanger, it is lifted free of the spring loaded tips 111a, 111b of platen 105, which allows platen 107 to close thereby actuating the control mechanism for the system to return reciprocating plate 105 back to its original starting position. If set on automatic, as soon as the plate 105 has reciprocated to its fully retracted position, it is reciprocated forward to automatically dispense another index coded cap and hanger.

In still another embodiment the system for color coding sizes of clothing displayed in retail clothing stores includes automatic means for removing the color coded index caps from the hangers.

Figure 9:
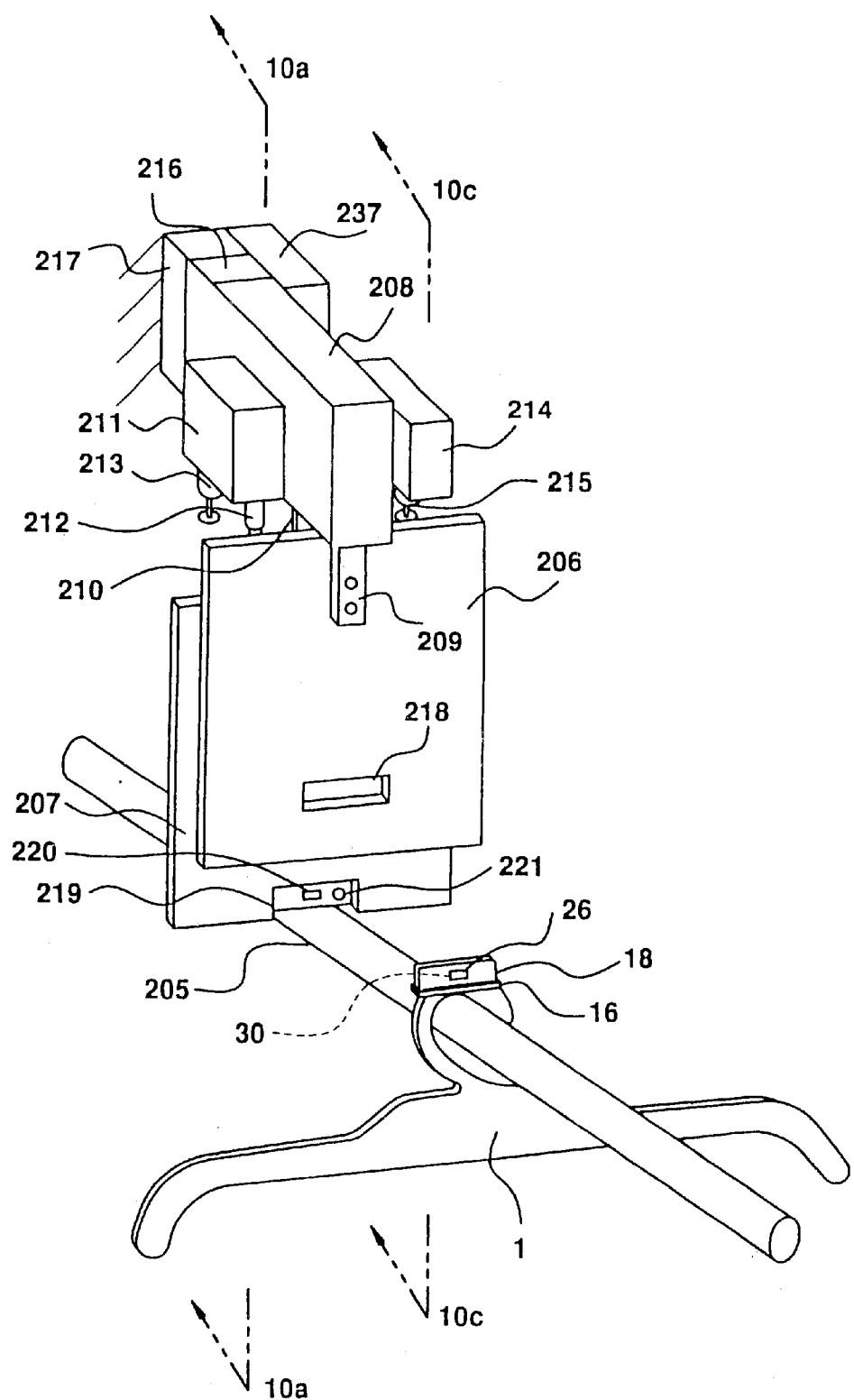
FIG. 9 is an isometric view of a mechanism useful in the dis-assembly or decapping of the color coded index caps from the hangers to enable reuse of the hangers.
Figure 10A:
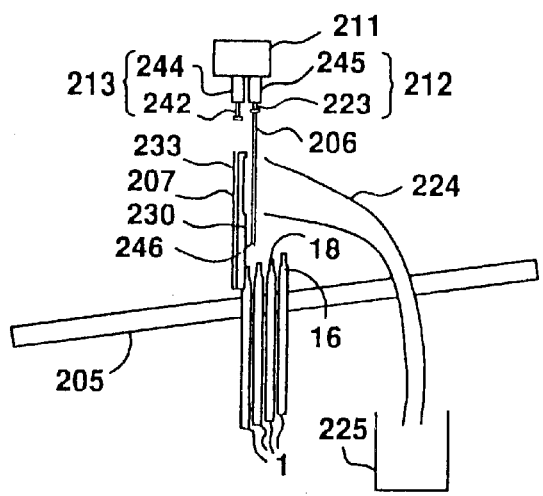
FIGS. 10(a), 10(b) and 10(c) illustrate in sequence the operation of the mechanism illustrated in FIG. 9 as the hanger and color coded index cap are decapped or disassembled.

FIGS. 9 and 10(a), (b), (c) and 13 illustrate one such means for removal, a decapping station 200, wherein the indicator attachment mechanism is of the embodiment depicted in FIGS. 1 and 2 herein. The laterally extending portion 30 of the indicator attachment mechanism is easily deflected by means of a pin 220 inserted in the aperture 24 of indicator 18 which engages the laterally extending portion to displace it towards the plane of web 4 to clear the aperture 24 and allow the indicator 18 to be removed from the hanger 1. Using this system, which is described more particularly in International Application No. PCT/US96/01286 the contents of which are incorporated herein by reference thereto, the color coded indexing caps can be automatically removed from their respective hangers 1.

In this embodiment the hanger 1 is fed to the apparatus for removing the color coded index cap by a feeding rail 205. The feeding rail is inclined so that the hangers 1 move downwardly toward the apparatus by gravity. To initiate the process the hangers 1 can be placed onto the feeding rail 205 manually or automatically. Other means to feed hangers 1 to the apparatus can comprise a screw conveyor, a belt conveyor, or any other appropriate means to carry the hangers toward the apparatus.

The apparatus of the present embodiment includes a front plate 206, a back plate 207 and an actuating means 208. Front plate 206 and back plate 207 are arranged vertically and are facing each other. In the embodiment shown in FIG. 9, the two plates 206 and 207 are almost quadratic, however, any other appropriate shape, for example rectangular, can be used.

The actuating means 208 includes a pneumatically driven escapement valve with two rods. Each of the rods is connected to the plate 206 or 207 via respective connecting means 209 and 210. In use, the actuating means 208 moves the front plate 206 and the back plate 207 parallel to each other in a vertical plane. This movement is periodically repeated to permit the removal of cap from one hanger after another.

Back plate 207 has a recess 219 positioned on an outer portion of the surface facing the front plate 206. Recess 219 is dimensioned to correspond to the dimensions of indicator 18, so that when a hanger 1 is pressed against the back plate 207, the indicator 18 is received in the recess 219. A pin 220 is provided on the back wall of the recess 219 in a position corresponding to the aperture 24 of the indicator 18. The dimensions, such as the size and the shape, of the pin 220 are selected according to the dimensions, particularly, the shape and the depth, of the aperture 24, so that the pin 220 enters the aperture 24 and is able to displace the laterally projecting portion 30 of the web 4 of the hanger 1 to clear the aperture 24, and permit the indicator 18 to be removed from the hanger 1. In the preferred embodiment of FIG. 9, the pin 220 has a rectangular cross-section, but another appropriate shape can be used.

Front plate 206 includes a through-opening or window 218. Window 218 is preferably dimensioned to correspond to the configuration of recess 219 of back plate 207. However, the window 218 can have any appropriate shape, as long as the indicator can pass through it. When back plate 207 is in its upper position and the front plate 206 is in its lower position, the recess 219 and the window 218 match, so that the indicator 18 can be removed from the recess 219 through the window 218.

In the described embodiment the preferred method for removal of the indicator 18 from recess 219 is by means of an air blast through aperture 221 in the back wall of recess 219. Aperture 221 is connected to an air control means by means of a tube 227, shown in FIG. 10(c). The air blast through the opening 221 is controlled so that when the back plate 207 reaches its upper position, and the front plate 206 is in its lower position, the air blast is generated or enabled, which pushes the indicator 18 through the window 218 of front plate 206. The released indicator passes through the window 218 and is collected by a discharge tube or chute 224, positioned in front of the window 218 and leads the released indicator to a container 225 (shown in FIGS. 10(a) and 10(c)).

The feeding rail 205 extends under the two plates 206 and 207. The distance between the plates 206 and 207 and the feeding rail 205 when the plates are in their lower positions is preferably such that pin 220 of back plate 207 will be aligned with aperture 24 of indicator 18. The height of the assembly is adjusted to provide an automatic operation for different styles of hangers and hooks.

As illustrated in FIG. 9 the back plate 207 is in its lower position and the front plate 206 is in its upper position. When hanger 1 moves down the feeding rail 205 toward the decapping apparatus the movement of the hanger 1 is stopped by the back plate 207.

Figure 10B:
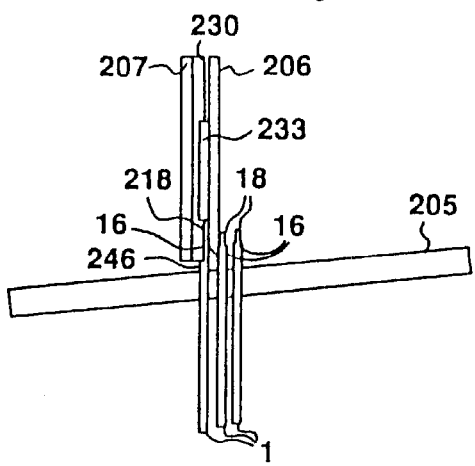
Figure 10C:
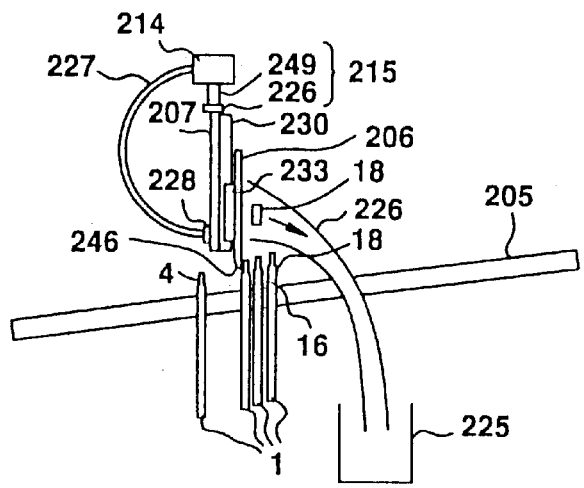

FIGS. 10(a), 10(b) and 10(c) illustrate the sequence of the operation for automatically removing color coded index caps from hangers in accordance with the present invention.

More particularly, FIG. 10(a) illustrates the start of the cycle for removing color coded index caps 18 from a plurality of hangers. As shown, it will be noted that the back plate 207 is lowered to its lowermost position and a plurality of hangers are waiting in front of the decapping apparatus on the feeding rail 205 in line for removal of the indicator caps 18 one after the other.

The front plate 206 is raised but only needs to be raised upwardly until it no longer covers the recess 219. In other words, the amplitude of the movement of the plates 206 and 207 has to be at least the height of the recess 219, so that the indicator 18 can be received in the recess 219.

Gravity pushes the foremost hanger with indicator into the recess 219 of back plate 207. After the indicator 18 is received in the recess 219 of the back plate 207, the front plate 206 is moved downwardly to seat the indicator 18 firmly or at least to hold the indicator firmly in the recess 219 of the back plate 207. In this position the pin 220 of the back plate 207 displaces the laterally extending portion 30 of the hanger 1, to permit the release of the indicator 18 from the hanger 1. The pin 220 is long enough to fully displace the laterally extending position 30 from the recess 24 of indicator 18, but is not long enough to engage the aperture 6 of hook 2.

FIG. 10(b) illustrates the sequence of removing the indicator 18 from a hanger 1 mid-cycle when both the front and back plates 206 and 207 are in their lower positions. After the pin 220 releases the indicator attachment mechanism the front plate 206 is lowered to separate the released indicator and hanger 1 from the rest of the hangers and also to engage the foremost hanger 1. To assist in the separation of the foremost hanger 1 with the released indicator from the other hangers the lower edge 246 of the front plate 206 can be beveled. The beveled lower edge 246 of the front plate 206 holds the hanger 1 down by abutting against the edge of the top region 16 of the hook of the hanger 1. As shown in FIGS. 10(a)–10(c) lower edge 246 of front plate 206 is beveled towards the back plate 207. As one alternative, lower edge 246 can have a step-shape.

FIG. 10(c) illustrates the end of the cycle wherein the pin 220 has displaced the laterally extending portion 30 from the indicator 18, and the indicator may be removed from hanger 1 when the back plate 207 is moved upwardly to its upper position, while the front plate 206 stays in its lower position. Since pin 220 of the back plate 207 extends into the aperture 24 of the indicator 18, the back plate 207 carries the indicator 18 upwardly. The front plate 106 engages hanger 1 and prevents the hanger 1 from also being carried upwardly.

Consequently, the pin 220 has two functions: displacing the laterally extending portion 30 of the hanger 1 to release the indicator 18 from the hanger 1 and carrying the indicator 18 upwardly to separate the indicator 18 from the hanger 1.

As previously described the indicator 18 is preferably removed from recess 219 by means of air blast through aperture 221 in back plate 207. The air blast pushes the indicator 18 through the window 218 of the front plate 206. The released indicator 18 passes through the window 218 of the front plate 206 and is collected by a discharge tube 224, which is positioned in front of the window 218 and leads the released indicator to a container 225.

Upon removal of the indicator 18 from hanger 1 and after back plate 207 is moved upwardly, hanger 1 continues to slide down the feeding rail 205. As illustrated in FIG. 10(c), hanger 1 with web 4 is moving down the feeding rail 205 after being decapped. The decapped hanger is either collected manually or automatically therefrom, for example by means of a screw conveyor 252, which can collect decapped hangers from a plurality of feeding rails 205 coming from respective decapping apparatuses.

As illustrated in FIGS. 9 and 10(a), the automatic means for removing indicators from hangers is driven pneumatically, and further comprises position control means 211, air control means 214, a first timer 216, a second timer 217, and an air valve 237. The air valve 237 generates and/or controls the pressurized air, by which the decapping apparatus according to the preferred embodiment of the present invention is controlled and driven.

The air valve 237, the timers 216 and 217, the actuating means 208, the air control means 240 and the position control means 211 respectively are connected by air tubes for pneumatic control. Also, the entire apparatus is held and fixed to a holding means (not shown).

As shown in FIG. 10(a), the position control means 211 comprises a first detector 212 for the position of the front plate 206 and a second detector 213 for the position of the back plate 207. The first detector 212 and the second detector 213 work on a pneumatical basis and have a similar structure. First and second detectors 212 and 213 each include generally a cylindrical tube illustrated by 244 and 245, respectively, and pistons 222 and 223, respectively, which are movable within each of said cylindrical tubes 244 and 246. The outer ends of pistons 222 and 223 are provided with contact plates, which are contacted by the upper sides of the front plate 206 and the back plate 207, respectively.

In the upper position, the front plate 206 and the back plate 207 press inwardly pistons 222 and 223, respectively, and cause a pneumatic signal in the position control means 211, thereby permitting a steady control of the position and the movement of the plates 206 and 207. FIG. 10(a) shows a cross section of the control means 211 and the plates 206 and 207, whereby the position of the plates 206 and 207 is the same as in FIG. 9. Also, the discharge tube 224 and a collecting container 225 for the released indicators 18 are illustrated.

FIG. 10(c) illustrates a side view of the air control means 214 and the tube plates 206 and 207. The air control means 214 comprises a third detector 215 for detecting the position of the back plate 207. Third detector 215 has a cylindrical tube 249 and a piston 226, which, generally have the same shape and function as the first and second position detectors 212 and 213 as described above. In FIG. 10(c), the back plate 207 is in its upper position, and the front plate 206 is in its lower position. The back plate having released and carried a indicator 18 upwardly from hanger 1, contacts a contact plate 226 of the position detector 215 and moves the contact plate 226 together with its piston into the cylindrical tube of the detector 215. This causes a pneumatic signal within the air control means 214, which enables a pressurized air blast through a tube 227, which is connected to the opening 221 of the back plate 207 by appropriate connection 228. The air blast through the opening 221 ejects the released indicator 18 through the window 218 of the front plate 206 into the discharge tube 224. The arrow in FIG. 10(c) indicates the direction of the movement of the indicator 18.

In operation, the back plate 207 moves downwardly to its lower position, which is followed by an upward movement of the front plate 206 to its upper position. The whole movement cycle is repeated periodically, so that a plurality of hangers 1 can be decapped easily and reliably in an automated process. Since one of the plates 206 and 207 is always in its respective lower position, there will be always a number of hangers 1 on the feeding rail 205 waiting to be decapped one after another, as shown in FIGS. 10(a)–10(c).

The actuating means 208 controls the movement of the two plates 206 and 207, so that the front plate 206 cannot move upwardly when the back plate 207 is not in its lower position, and the back plate 207 cannot move upwardly when the front plate 206 is not in its lower position. This ensures that the hangers to be decapped do not slide along the feeding rail 205 under the plates 206 and 207 without being decapped.

The first timer 216 controls the regular cycle of the movement of the two plates 206 and 207, whereas the second timer 217 enables a repeated downward movement of the front plate 206. If, for example the hook of the hanger 1 is bent or damaged, or the indicator 18 is bent or damaged, the front plate 206 is not permitted to slide downwardly to press or hold the indicator 18 into the recess 219, since its lower edge contacts the upper edge of the indicator 18 and is therefore restricted in its downward movement. In this case, the timer 217 gives a signal to the actuating means 208 to lift the front plate 206 up again and retry to move it downwardly. This is repeated, until the indicator 18 is properly received in the recess 219 of the back plate 207 and the front plate 206 can move to its lower position without resistance. This problem can already partially be avoided by an appropriate angle or bend of the lower edge of the front plate 206, as discussed above.

Figure 13:
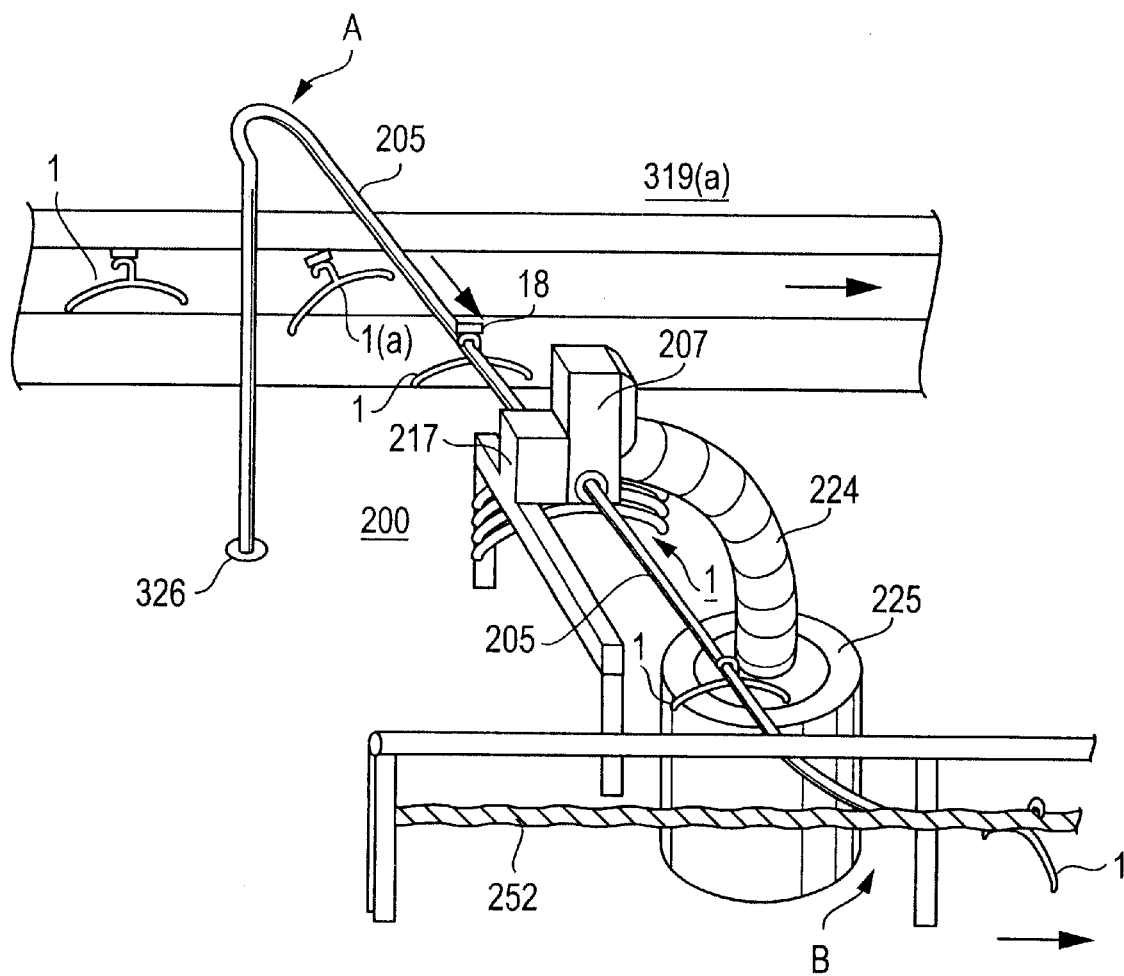
FIG. 13 is a diagrammatic and isometric view of one of the decapping stations, receiving hangers with index caps from a conveyor sort line, and feeding decapped hangers to a hanger conveyor.

Although the system of FIGS. 9, 10 and 13 has been illustrated with only one style of hanger shown in FIG. 5, it is contemplated that a hanger of any other style, including any of the styles shown in FIG. 5, could be substituted therefore.

Figure 11:
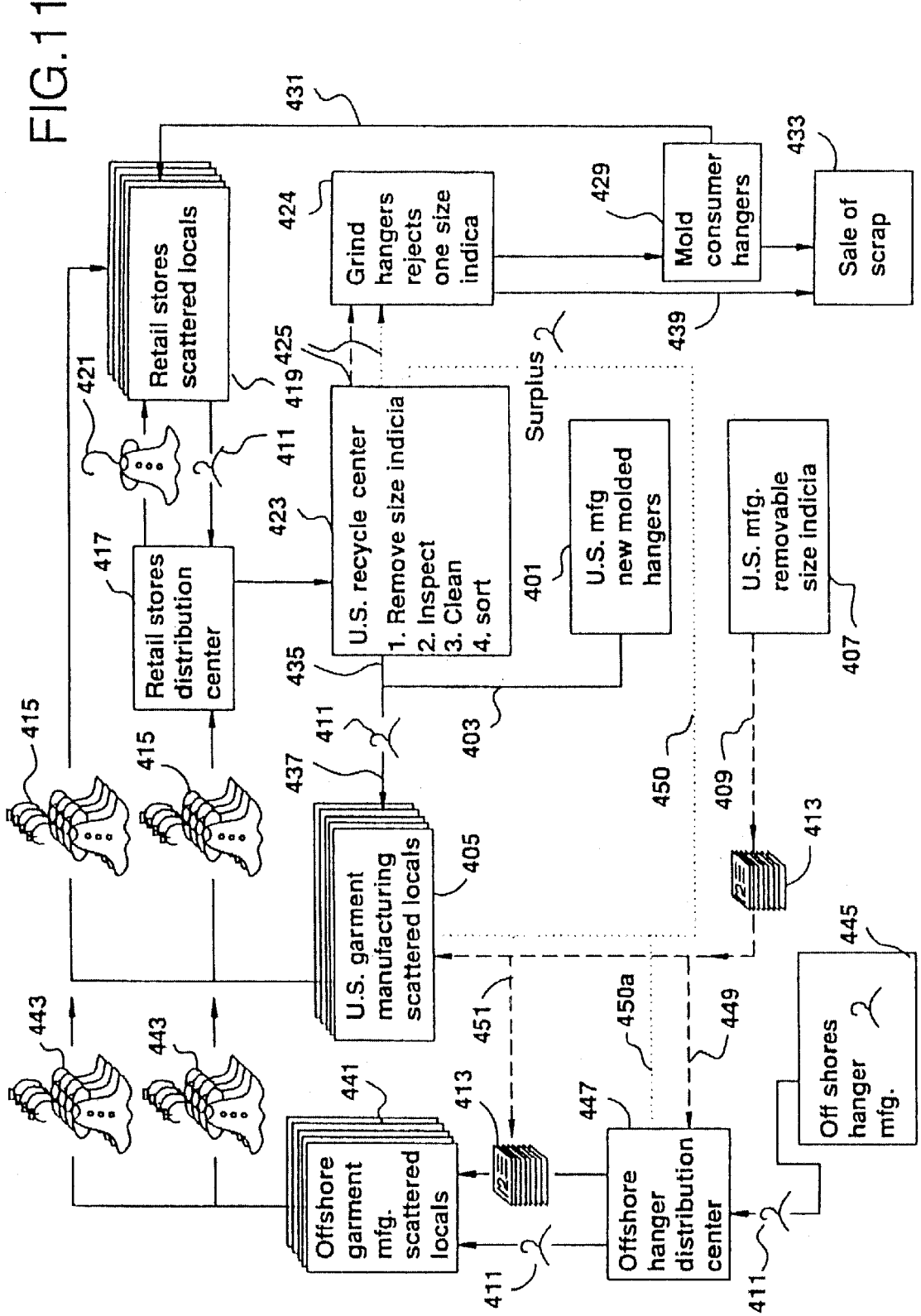
FIG. 11 illustrates a diagram for implementing the method for re-using hangers having size indicia.

As illustrated in FIG. 11, a method for re-using hangers having size indicia removably mounted thereon is illustrated in a schematic flowchart form. A hanger manufacturing center 401 molds hangers and ships the hangers via distribution channel 403 to a plurality of garment manufacturers 405 at scattered geographic locales. While a single group of garment manufacturers 405 are illustrated in FIG. 11, it should be noted that in actual practice, there may be hundreds of garment manufacturers that supply garments to any large retail outlet.

Simultaneously, a plurality of removable size indicia are molded at 407 and shipped in bundles 413 of size indicia via distribution channel 409 to these same garment manufacturers 405.

At each of the plurality of garment manufacturers 405, a single hanger 411 and a single index cap from bundle 413 are assembled with the garment manufactured by the U.S. garment manufacturing facility at that geographic local. The size indicia represents at least one characteristic of the garment, and preferably indicates the size of the garment as denoted in the country in which the retail store to which the garment is to be shipped, is located. A plurality of hangers, garments and size indicia are then batched as illustrated at 415, and the batch is shipped to a retail store 419 or a regional distribution center 417 operated by the retail store chain 419.

The regional distribution center 417 provides a supply of garments on hangers 421 to the various retail stores 419 at scattered geographic locations for sale to consumers. At the point of sale in the retail store 419, the garments are removed from the hangers and the hangers 411 are returned to the regional distribution center 417. It is preferred that the hangers are shipped to the distribution center in collapsible pallet-sized boxes with plastic lids known as gaylord containers. While it is preferable to return all of the hangers to the regional distribution center 417, it is noted that in actual practice, from 10–25% of the hangers shipped from the distribution center to the retail store as garments on hangers 421 are not returned, but are sold with the garment to the consumer, or are damaged or otherwise lost in use.

At the regional distribution center 417, the hangers are batched and sent to the reuse/recycle center 423, again preferably in the collapsible pallet-sized boxes 410, where the removable size indicia are removed, and the hangers are inspected and sorted by size and type, and then cleaned.

In a preferred embodiment of the invention, the size indicia are automatically removed as previously described with respect to FIGS. 7 and 8.

At the recycle center 423 it has been found that from 10–30% of the hangers returned are no longer suitable for reuse because of excess wear, breakage, warpage, gum tags or other debris which can not easily be removed.

The hangers that fail the inspection and the index caps are returned via distribution channel 425 to a location which grinds or granulates the hanger rejects and index caps as illustrated at 427. At location 427, the hangers are also separated to classify the hangers according to the material from which they were molded, with polypropylene and polystyrene being the two primary materials from which hangers are molded. The polypropylene granulated material is then used to mold consumer hangers as indicated at 429 which may be returned by a distribution channel 431 for sale to consumers. The remaining material not suitable for remolding is sold as scrap as indicated at 433.

At the recycle center 423, it has been found that from 30–50% of the hangers that originally entered the recycling loop at 403 are available for redistribution. The hangers 411, without any size indicia matter thereon, are then reshipped to the garment suppliers 405 as part of the order fulfillment at supply line 435. The supply of hangers at 435 is augmented by freshly molded hangers as indicated at 403 and the combined stream of recycled and new hangers 437 is returned to the garment suppliers 405 as indicated in FIG. 11. It is contemplated that each hanger will pass through the loop 2 to 6 times before it becomes unrecoverable. The hangers shipped from the recycle center 423 for reuse can be shipped to either US or offshore garment manufacturers. However, since it is contemplated that only 50–80% of the originally molded hangers will be reused the supply may only be sufficient to meet the demands of the closer, in this instance, the US garment manufacturers. The cost of molding vs. shipping internationally must also be taken into consideration when dealing with offshore garment manufacturers. However, the higher shipping costs are often outweighed to meet a particular customer's demand in an offshore country.

Simultaneously therewith, a new plurality of removable size indicia are molded at 407 and shipped via channel 409 to the garment manufacturers 405 to be reassembled with the hanger arriving from product stream 437.

At the present time, it has been found that the labor and material handling required to sort the removable size indicia at the recycle center 423 is more expensive then newly molding the removable size indicia at step 407. Not only are the removable size indicia molded in a plurality of colors, but each of the colors may represent as many as ten different sizes as herein before previously described. In addition to the sorting, the removable size indicia must be inspected, and reassembled into a magazine or plurality of stacked caps suitable for automated assembly with the hangers and garments at the garment manufacturers 405. Consequently, in the normal course of proceeding, the removable size indicia are ground at step 427 and sold as scrap at step 433 as indicated by channel 439. However, it is possible for the size indicia to be sorted at the recycle center 423 and then shipped back to the garment manufacturers for reuse.

Presently, a significant percentage of garments sold in the retail stores 419 are manufactured off shore in areas such as China, Thailand, India, Ceylon, Turkey and countries of the Near East. These offshore garment manufacturers are indicated at 441 and provide essentially the same function as the domestic manufacturers indicated at 405 inasmuch as each of these entities manufactures a garment, and then assembles a hanger 411, an index cap from the bundled stack 413 and the garment in an automated production line to form a product known as G.O.H. (Garment On Hanger) which is ready for display in the retail stores 419. The G.O.H. garments are then batched as indicated at 443 and shipped via international transport, in generally intermodal or airborne containers, to the regional distribution center 417.

Inasmuch as the hangers, when molded represent a substantial bulk, it is upon occasion, less expensive to mold the hangers offshore as illustrated at 445 and ship the hangers 411 to a regional hanger distribution center 447, than to mold and ship from the US facility 401. Regional hanger distribution centers 447 may be located in such diverse geographic locales as Hong Kong, India or Turkey and intended to serve clusters of manufacturing entities located within a few hundred miles of the regional distribution center.

Batches or bundles of removable size indicia 413 are also molded at 407 and shipped via distribution channels 409, 449 and 451 to the offshore distribution centers 447 or offshore garment manufacturers 441. The offshore distribution center 447 then makes separate shipments of hangers 411 and bundles of removable size indicia 413 to the offshore garment manufacturers 441. The offshore garment manufacturer then assembles one of the hangers, one of the removable size indicia and one of the garments to provide a garment on hanger (G.O.H.) wherein the removable size indicia corresponds to the size of the garment.

Molding the removable size indicia at a single location such as that indicated at 407 ensures that the colors chosen for the removable size indicia are consistent when they arrive at the retail stores 419 even though the adjacent garments and hangers may have been assembled thousands of miles apart from each other. In addition, the bulk and size of the bundles removable size indicia 413 render them susceptible to transoceanic shipment and use.

While in the preferred embodiment, the removable size indicia are all molded in a single location, it would be entirely possible to mold the removable size indicia in one or more offshore molding facilities, provided precise control is maintained over the pigments used in the color indexing scheme.

There may also be a flow of returned surplus hangers as indicated along distribution channel 450 and 450a which may be used to augment the supply of hangers at 435 instead of molding new hangers at 401.

In the preferred embodiment, the hanger of the present invention is formed from styrene, K resin, H.I. styrene, polypropylene, other suitable thermoplastic or combinations thereof. The indicator of the present invention is formed from styrene or any other suitable plastic material.

Commercially available resins are available with control crystallinity, nucleation and anti-static properties which improve the durability and the cleanability of the hangers molded from these plastics. The typical general purpose polypropylene with controlled crystallinity and anti-static properties may be found at the TSCA Registry: CAS #9003-07-0. The resin properties of this polypropylene are as follows:

| Typical Resin Properties[a] | | ASTM Method[b] |
|---|---|---|
| Melt flow rate, dg/rnin | 12 | D 1238 |
| Density, g/cm$^3$ | 0.90 | D 792A-2 |
| Tensile strength at yield, psi (MPa) | 5,400(37) | D 838 |
| Elongation at yield, % | 9.5 | D 638 |
| Flexural modulus, psi (MPa) | 275,000(1,900) | D 790B |
| Rockwell hardness, R Scale | 105 | D 785A |
| Deflection temperature, ° F.(° C.) at 66 psi (455 kPa) | 244(118) | D 648 |
| Notched izod impact strength at 73° F.(23° C.), ft-lbs/ln. (J/m) | 0.6(33) | D 256-A |

As discussed previously, with respect to FIG. 11, when the hangers 411 return from the retail stores 419 to the distribution center 417, and then to the recycle center 423, the hanger are shipped in collapsible shipping pallet size boxes 410 with plastic lids, known as a gaylord. These gaylord-type containers may include molded plastic bottom and top members, and collapsible fiberboard sides which are collapsible and reusable after the hangers have been emptied from the gaylord into the recycle or reuse center.

Figure 12:
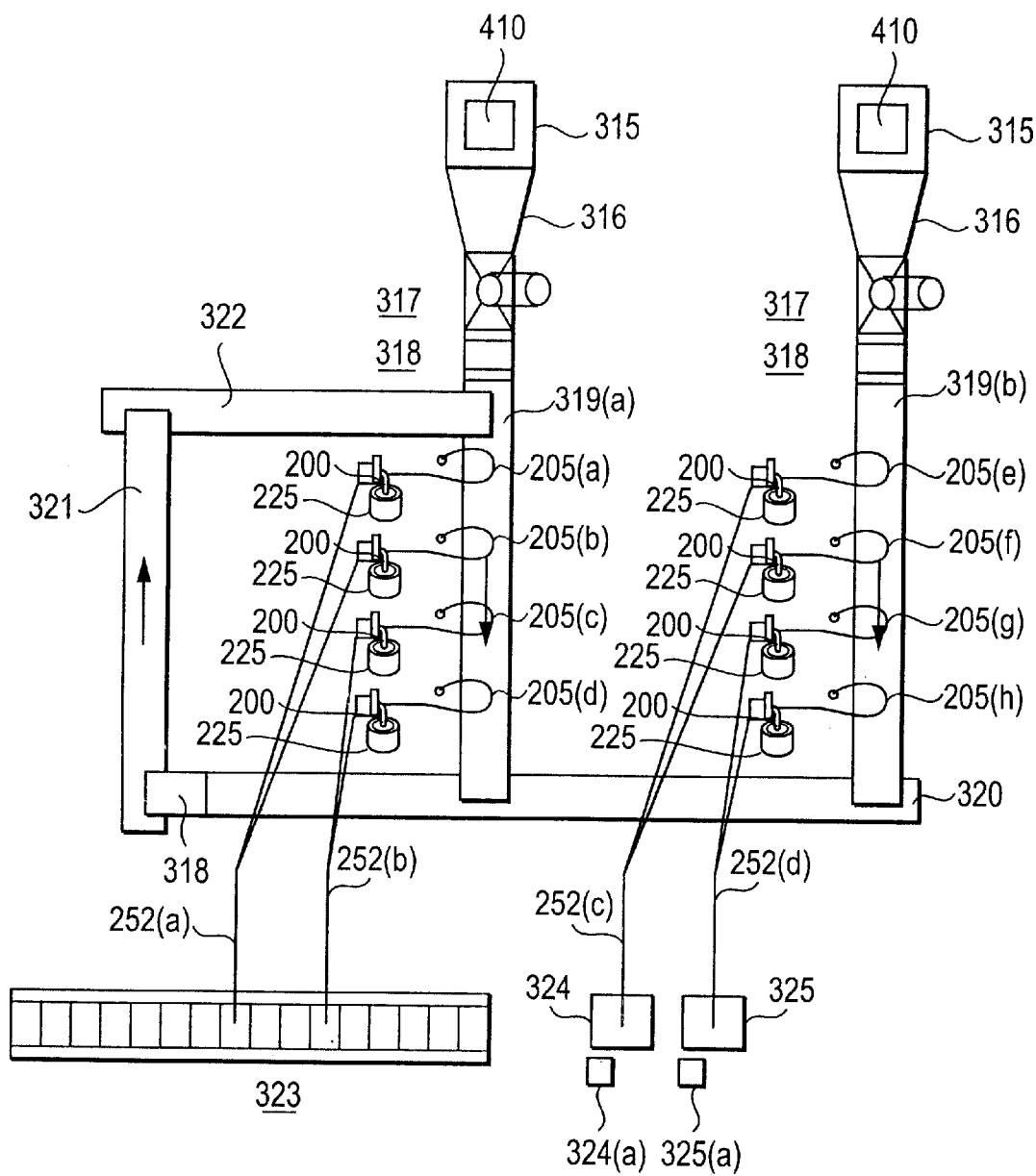
FIG. 12 is a top plan view of a system for receiving, cleaning, decapping, sorting and packaging the individual members of the family of hangers into preselected shipping cartons.
Figure 14:
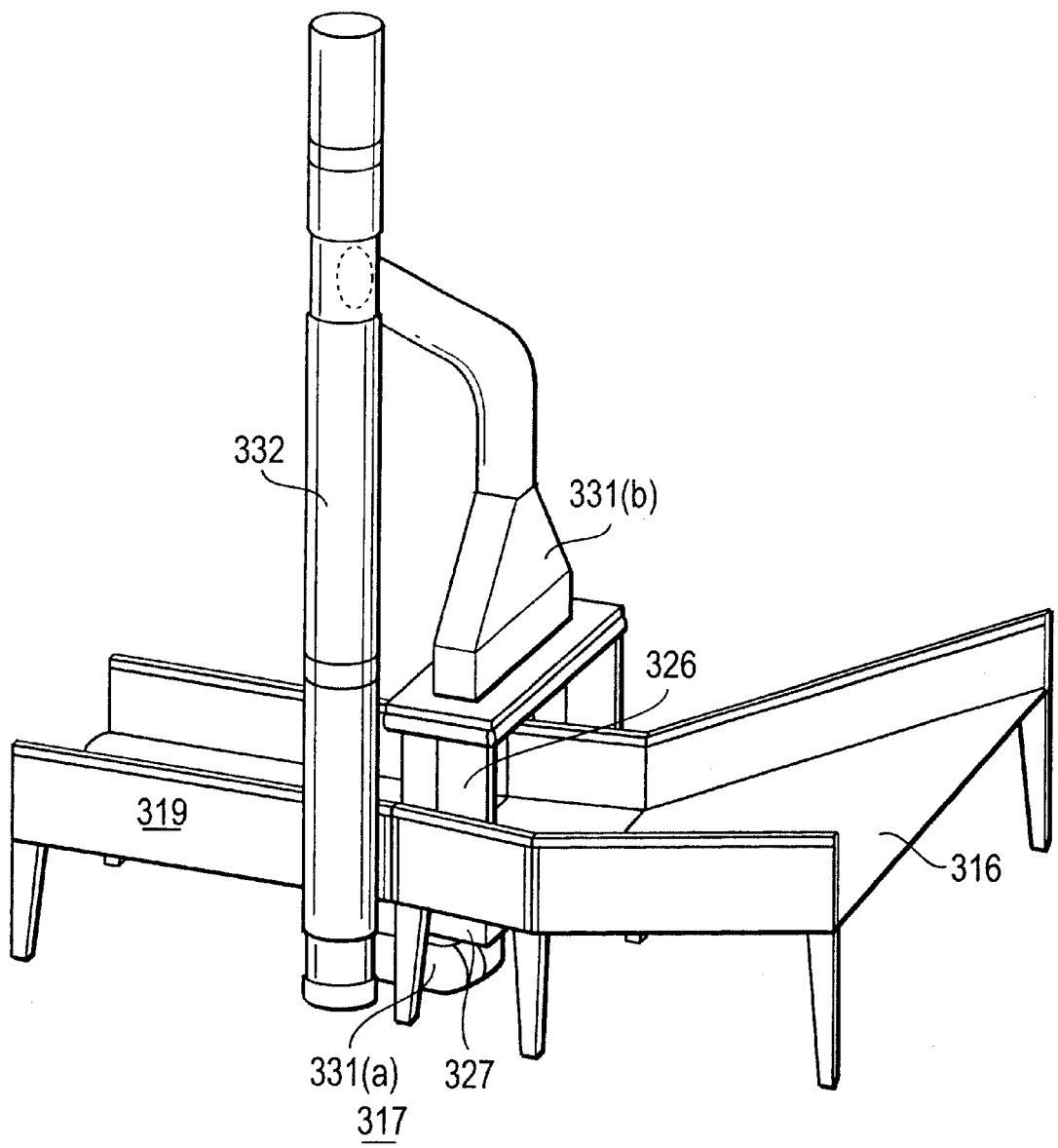
FIG. 14 is a diagrammatic and isometric view of a station for receiving bulk hangers returned to the reuse center, and cleaning the same prior to decapping.

As illustrated in FIG. 12 and FIG. 14, the gaylords 410 are first uncovered by removing the plastic top, and then positioned on an unload station such as illustrated at 315 in FIG. 12. The unload station then tips the gaylord and deposits the hangers into a receiving chute 316 wherein the hangers are fed to a cleaning station generally illustrated in FIG. 12 at 317, the operation of which will be discussed in greater detail hereinafter in this application. The output of the cleaning station 317 is a conveyor 319 illustrated as conveyors 319a and 319b in FIG. 12 which convey the hangers past a plurality of sorting stations and gravity feed rails 205.

In a preferred embodiment of the invention, a plurality of semi-automatic sorting stations are provided for inspecting and sorting hangers. Conveyors are used to automatically bring hangers to a plurality of operators, and a gravity feed rail is provided to automatically remove the sorted hangers and transfer them to a plurality of automatic decapping stations. The manual step is removing the hanger from the conveyor and placing it on the gravity feed rail. At each of the semi-automatic stations, an operator stands adjacent one of the conveyors 319a, 319b or 321 and sorts hangers by type onto the gravity feed rails 205 as the hangers are fed past the operator by the conveyor. For example, an operator positioned opposite gravity feed rail 205(a) may be sorting and retrieving only 12 inch top hangers such as illustrated at 304 in FIG. 5 and that operator manually places the selected hanger on gravity feed rail 205a illustrated in FIG. 12. As illustrated in the arrangement of FIG. 12, a second operator would be positioned opposite sorting rail 205b to retrieve hangers of the same type from conveyor belt 319(a) and place them on the downwardly angled sorting rail 205b so that the hanger would be decapped at the decapping station 200. Hangers from both 205a and 205b would continue on to a single screw conveyor 252a as illustrated in FIGS. 12 and 13 to be repackaged for shipment to garment manufacturers.

Similarly, in the arrangement illustrated in FIG. 12, a second pair of operators positioned opposite sorting rails 205c and 205d would retrieve a different style of hanger from conveyor 319(a) and position them on the sorting rails 205c and 205d to be decapped at decapping stations 200 and fed to the screw conveyor 252b. Similar arrangements for additional operator positions adjacent conveyors 319(b) and 321 may be provided as desired, with gravity feed rails 205(e)–(h) defining sort stations for conveyor 319(b) and gravity feed rails 205(i)–(l) defining sort stations for conveyor 321. As illustrated in FIG. 12, the output of conveyors 319(a) and 319(b) feed to a common conveyor 320 which links the two sort paths and conveys any unsorted hangers to conveyor 321, and sort stations 205(i)–(l). Conveyors 321 and 322 carry any unsorted hangers back around to conveyor 319(a). The hangers that are not sorted and retrieved in their first pass past sort rails 205a–d, 205e–h and 205i–l continue around for a second pass through the sorting conveyors 319(a),(b) and 321 until each type of hanger has been retrieved and loaded onto one of the gravity feed sort rails 205.

Conveyor 320 also includes a station for removing trash, broken hangers, and loose size caps at a trash collection station 318, as will be hereinafter described in detail.

Screw conveyors 252(a)–(f) remove the hangers from the plurality of decapping stations 200 and then provide them to a plurality of cartons for repackaging for shipment to clothing manufacturers. As illustrated at stations 323(a),(b), a plurality of cartons are loaded on roller conveyors wherein the individual cartons may be filled with multiples of the same hanger, or assigned individual hangers and repositioned following the end of each batch sort by the operators at stations 205(a)–(d) and 205(i)–(l). Alternate loading stations may be provided, such as the sorting stations 324 and 325 which include flat work surfaces such as tables that enable an operator to examine the hanger and perform manual operations thereon, such as closing the pinch grips of bar hangers before being repackaged in cartons 324a or 325a.

A representative decapping station 200 is illustrated in FIG. 13 when the gravity feed sort rail 205 is secured to the floor as indicated at 326 and then extends upwardly and then outwardly over the traveling surface of conveyor 319 to provide sort access to the sort rail for the operator positioned adjacent the conveyor. An operator positioned on the far side of conveyor 319(a) as illustrated in FIG. 13 will remove individual hangers, such as hanger 1(a) illustrated in FIG. 13, and place it on the sliding surface of feel rail 205 at or near the point on the sort rail indicated by the arrow A in FIG. 13. From point indicated by arrow A, the hanger is fed by gravity to the decapping station generally indicated at 200, which decapping station was previously described in detail with respect to 9 and 10. As each hanger having an index cap 18 is fed into the decapping station 200, the index cap 18 is removed and then discharged through vacuum discharge conduit 224 to be collected in container 225 for subsequently grinding, disposal or reuse. The hanger 1, without the index cap 18, then slides downwardly along feed or sort rail 205 to be fed onto the screw conveyor 252 as indicated at the letter B. The decapped hanger 1 is then fed via screw conveyor 252 to the packaging stations 323–325 as previously described with respect to FIG. 12.

Figure 15:
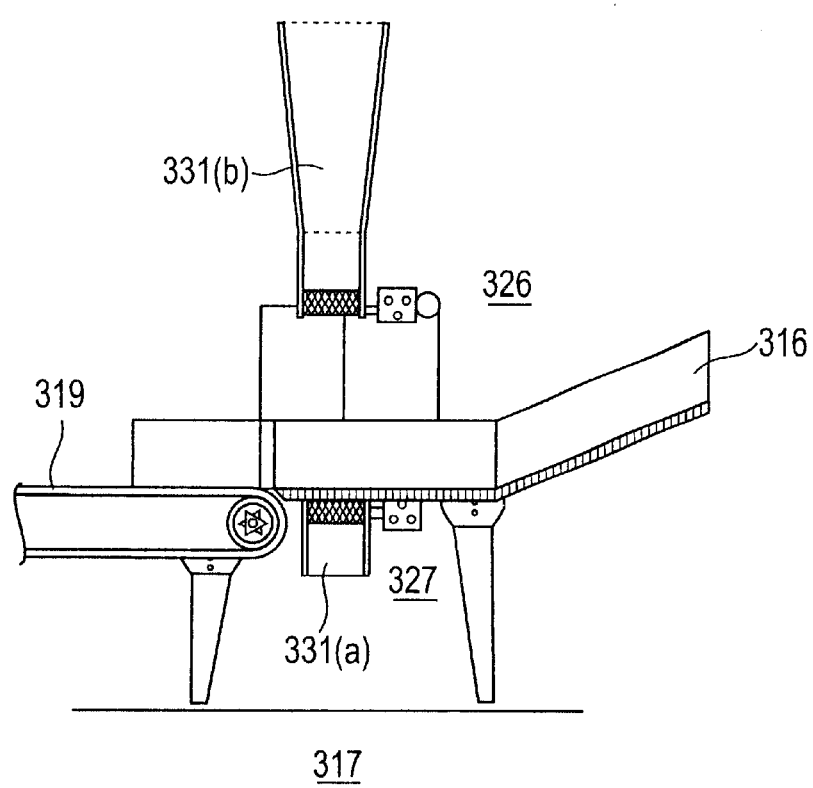
FIG. 15 is a cross-sectioned elevation view of the receiving and cleaning station illustrated in FIG. 14.

Each of the incoming feed lines from hoppers 316 illustrated in FIG. 12 also include a hanger cleaning station 317 which will be hereinafter described in greater detail with respect to FIGS. 14–16. As illustrated in FIG. 14, the cleaning station includes a hopper 316 which received a bulk discharge of hangers from one of the gaylord shipping containers used to return the hangers from the retailer distribution center to the reuse/recycle facility. The hangers are fed by gravity through intake hopper 316 to the cleaning station 317. As illustrated in FIG. 15, each of the cleaning stations includes an upper and lower cleaning station 326, 327, with cleaning station 327 being more fully illustrated in plan view in FIG. 16. Each of the cleaning stations includes three components, an electrostatic charge neutralizer, such as an ion generator, high pressure jets of air to dislodge the dust particles and a vacuum dust collection system.

Figure 16:
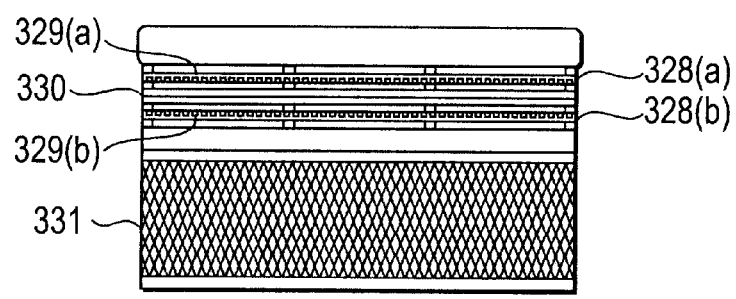
FIG. 16 is a plan view of a portion of an electrostatic cleaning station used to remove dust and lint from the hangers intended for reuse in the present invention.

As illustrated in FIG. 16, each of the cleaning stations include first and second 328a,b air manifolds or plenums that deliver pressurized air through a multiplicity of discharge nozzles 329a,b which create a multiplicity of high velocity jets of air. These jets of air pass over the electrostatic bar 330 of the ion generator to create streams of ionized air that are used to simultaneously neutralize static charges on the surfaces of the incoming hangers and to dislodge the dust and clothing particles from the hangers.

It has been found that hangers returned to the reuse center from the retail establishments after repeated handling and contact with various clothing surfaces may carry a static charge as high as a –3000 volts on the surface of the hanger. This negative charge attracts and retains dust particles and minute particles of clothing debris. This charge must be neutralized before the hangers can be effectively cleaned, since even if the dust particles are dislodged by the high velocity jets of air, they will be attracted back to the hanger or to another hanger in short order. Thus, the high velocity streams of air contain ions which neutralize the charge on the plastic hanger, the high velocity jets of air dislodge the dust from the surface of the hanger and a vacuum collection system 331 creates a negative pressure zone into which the jets of air and entrained dust particles are collected.

Figure 17:
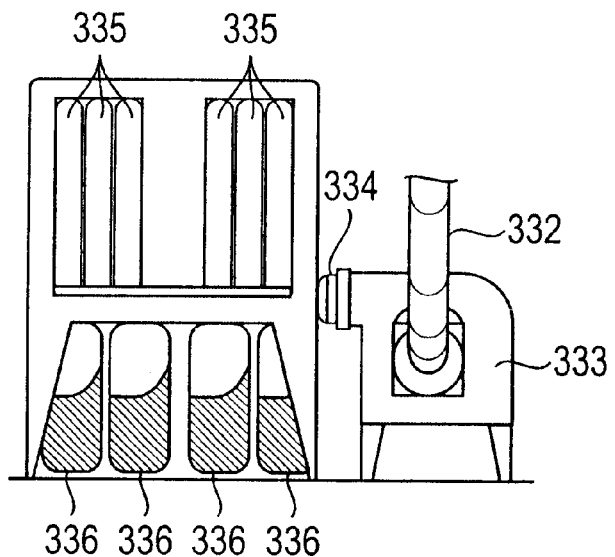
FIG. 17 is a diagrammatic view of a cleaning apparatus used to remove dust and lint from the airstream after the hangers have been cleaned.
Figure 18:
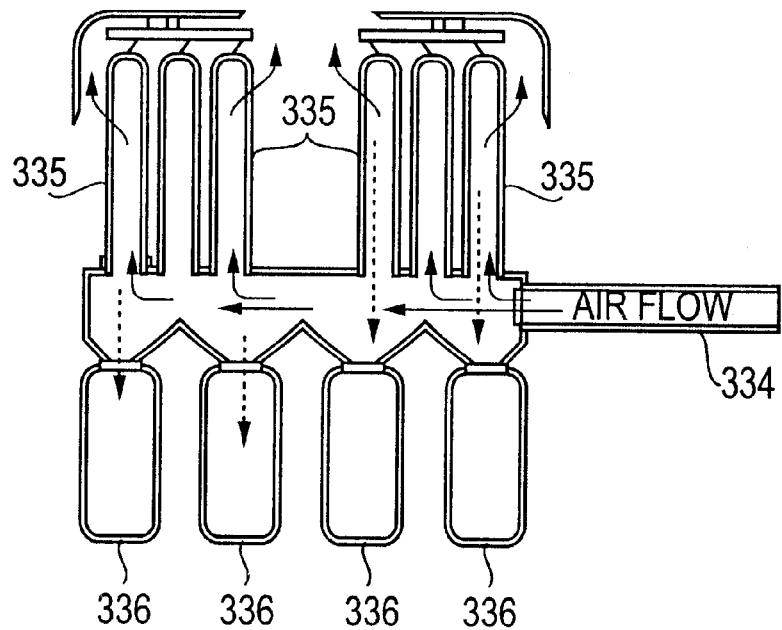
FIG. 18 is a cross section of the apparatus illustrated in FIG. 17 which illustrates an apparatus which periodically cleans the filters employed in the apparatus illustrated in FIG. 17.

As illustrated in FIG. 15, the vacuum hoods 331a,331b are connected together as illustrated in FIG. 14 with a common low pressure plenum 332 which is returned to a dust collection and filtration system more fully illustrated in FIGS. 17 and 18.

As illustrated in FIGS. 17 and 18 an air handler 333 generates a negative air pressure of 8 inches $H_2O$ in plenum 332 which is connected to each of the cleaning stations 317. The plenum may be formed of snap-together commercially available vacuum tubing intended for high pressure environments. The air handler 333 provides an output stream of positive pressure to output plenums 334(a), (b) which are exhausted through a plurality of flexible filters 335. While the filters may be of any construction, in the preferred embodiment they are fabric filters with an emission rate of 1 mg/m$^3$, which rate is selected to retain the dust and clothing particles normally found on the hangers. The filters are suspended from agitators 339(a), 339(b) mounted on frame 341, and have an open bottom 335(a) for ease of cleaning the filters and disposing of the collected dust and clothing particles. This system not only cleans the hangers and removes the dust and clothing particles from the hangers, but provides a significant improvement in the air quality for the workers at the plant since the air collection plenums 331a,b collect not only air passing over the hangers, but also ambient air from the entire facility which migrates to the collection hoods by virtue of the negative pressure at the opening of the hoods.

Periodically, on a daily or weekly basis, the air handler 333 is stopped, and the fabric filters 335 are agitated by agitators 339(a),(b) to cause the dust particles which have been trapped on the inner surface of the filters to fall through the open bottoms 335(a), through the plenum 334(b) and into the collection bags or containers 336 mounted thereon as illustrated in FIGS. 17 and 18. The collection bags 336 are preferably formed of disposable poly bags which may be periodically removed from the apparatus and replaced with empty bags.

As discussed previously, the hangers that have passed through the cleaning stations 326,327 are removed from the cleaning apparatus by conveyors 319a and 319b. Any hangers which are not removed at the sorting stations 205, and any debris associated with the shipment of hangers such as broken hangers, trash particles, metal springs from the clip hangers or loose size caps, pass to return conveyor 320. At the end of return conveyor 320 is a trash removal system 318 which is more fully illustrated with respect to FIGS. 19 and 20.

Figure 19:
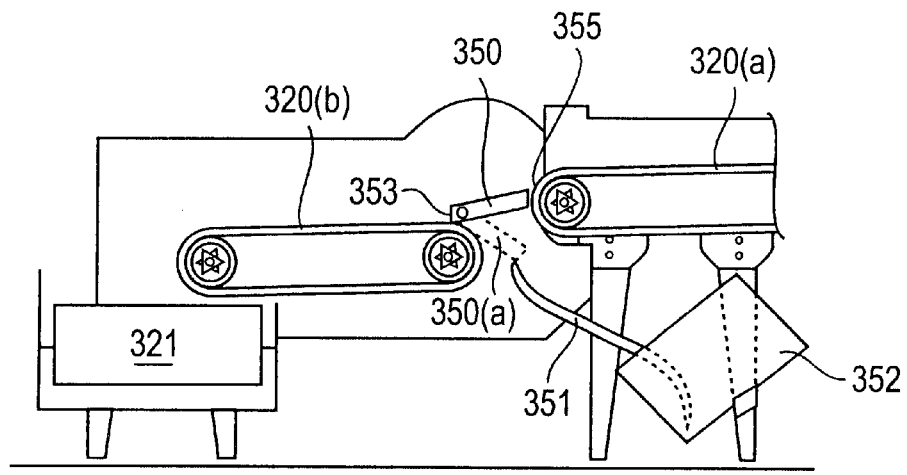
FIG. 19 is an elevation view of an apparatus used to remove debris, broken hangers and parts thereof from the stream of hangers to be reused.
Figure 20:
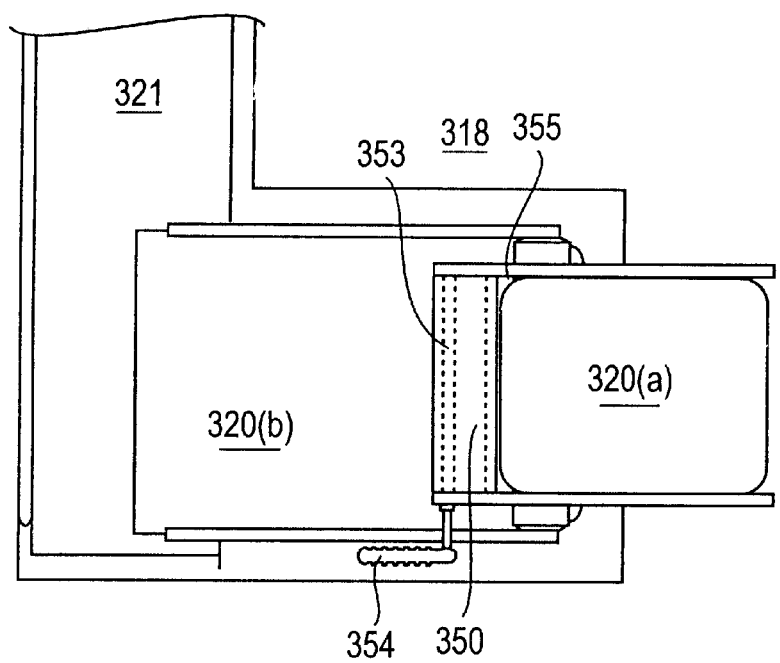
FIG. 20 is a top plan view of the apparatus illustrated in FIG. 19.

As illustrated in FIGS. 19 and 20, the trash removal system is positioned at the end of conveyor 320 and includes first and second conveyors 320a,b and an angled moveable bridge 350 which is positioned approximately ½ inch from conveyor 320a and angled slightly with respect to the upper surface of conveyor 320a to provide a downward sloping surface to bridge the space between conveyors 320a and 320b. While the drawings illustrate a single trash removal station at 318 at the end of conveyor 320 in FIG. 12, it is understood that a plurality of stations may be used with individual stations located anywhere in the loop as desired, and the arrangement of FIGS. 12, 19 and 20 is for illustrative purposes only. This bridge member creates a gap in the conveying surface between conveyor 320 and bridge piece 350 which allows trash particles to fall through the gap and be collected by a collection chute 351 and deposited via gravity in a collection bin 352.

Periodically, it may be desirable to dislodge small particles of trash which have collected on bridge piece 350. To facilitate this removal, and avoid contact with the moving conveyors, the bridge piece 350 is pivotally mounted on a shaft 353 which extends the width of conveyor 320 and enables rotational positioning of the bridge piece 350 from the home position illustrated in FIG. 19 to the discharge position 350a, also illustrated in FIG. 19. Attached to the end of shaft 353, outside the conveyor, is a handle member 354 which enables the manual rotation of bridge member 350 on a periodic basis to dislodge any accumulated debris into collection chute 351. In the preferred embodiment, it has been found that the bridge piece 350 is approximately 4 inches in bridge length, and forms a bridge between conveyors 320a and 320b for hangers that pass through the trash removal station 318. The hangers are sufficiently long, and the bridge sufficiently short that the motive driving force from conveyor 320a continues to drive the hanger across the bridge until it reaches the driving surface of 320b wherein it is pulled from the bridge. Smaller pieces of hangers and debris are not driven across the bridge and fall through the separation space 355 to be collected by the trash chute 351. The hangers collected on conveyor 320b are then deposited on return conveyor 321 for return back to a sorting conveyor such as conveyor 319(a).

While there have been shown and described what are considered to be the preferred embodiments of the invention, it will, of course, be understood that various modifications and changes in form or detail can be readily made without departing from the spirit of the invention. It is therefore intended that the invention not be limited to the exact form and detail herein shown and described nor to anything less than the whole of the invention herein disclosed as hereinafter claimed.

We claim:

1. A system for reusing plastic hangers having size indicia removably mounted thereon, said system comprising:
    (a) a first plurality of hangers shipped to a plurality of clothing manufacturers at scattered geographic locals;
    (b) a plurality of removable size indicia that are shipped to said plurality of clothing manufacturers at said scattered geographic locals, said removable size indicia adapted to be removably secured to said first plurality of hangers;
    (c) automated means to assemble a single one of said plurality of hangers, a garment and a single one of said removable size indicia, said size indicia representative of said garment;
    (d) a plurality of containers for collecting a plurality of said hangers with attached size indicia at a plurality or retail establishments following the sale and removal of the garment therefrom;
    (e) automated means for removing said size indicia from said hangers at said reuse center and sorting said hangers to a predetermined percentage of the plurality of hangers that are returned and selected for reuse.

2. A system for reusing plastic hangers having size indicia removably mounted thereon as claimed in claim 1, said system further comprising means for molding batches of said removable size indicia for each first plurality of hangers shipped.

3. A system for reusing plastic hangers having size indicia removably mounted thereon as claimed in claim 2, said system further comprising a color schema for said removable size indicia in a plurality of colors to provide color coded hangers having a color code which relates to a characteristic of the garment suspended from said hanger when said indicia, said hangers and said garments are assembled.

4. A system for reusing plastic hangers having size indicia removably mounted thereon as claimed in claim 3, wherein said color coded size indicia are molded at a single location to ensure color uniformity.

5. A system for reusing plastic hangers having size indicia removably mounted thereon as claimed in claim 4, said system further comprising a plurality of remote molding locations to augment the hangers shipped to said clothing manufacturers.

6. A system for reusing plastic hangers having size indicia removably mounted thereon as claimed in claim 1, wherein said preselected percentage ranges from 65% to 95% of said first plurality of hangers.

7. A system for reusing plastic hangers having size indicia removably mounted thereon as claimed in claim 6, wherein the preselected percentage of said selected hangers ranges from 50% to 80% of the number of said first plurality of hangers.

8. A system for reusing plastic hangers having size indicia removably mounted thereon as claimed in claim 1, said system further comprises a means for cleaning said hangers.

9. A system for reusing plastic hangers having size indicia removably mounted thereon as claimed in claim 8 wherein said means for cleaning the hangers includes means to neutralize any static charges present on the returned hangers.

10. A system for reusing plastic hangers having size indicia removably mounted thereon as claimed in claim 9 wherein said means for cleaning the hangers further includes a plurality of air jets to remove particles of dust and clothing from the surface of the hangers.

11. A system for reusing plastic hangers having size indicia removably mounted thereon as claimed in claim 9 wherein said means for cleaning the hangers includes a vacuum plenum for removing said jets of air and entrained particles of dust and clothing.

12. A system for reusing plastic hangers having size indicia removably mounted thereon as claimed in claim 11 further including a dust filtration system wherein said dust filtration system includes a plurality of flexible filters having open bottoms, with a collection bag positioned below each open bottom.

13. A system for reusing plastic hangers having size indicia removably mounted thereon as claimed in claim 8 wherein said means for cleaning the hangers further includes an electrostatic ion generator and at least one manifold having a plurality of nozzles to generate air jets that pass over said ion generator, said air jets dislodging particles of dust and clothing from the surface of the hangers as any static charges on the hangers are neutralized.

14. A system for reusing plastic hangers having size indicia removably mounted thereon as claimed in claim 13 further including a vacuum plenum wherein said vacuum plenum is connected to a dust filtration system to remove said entrained particles of dust and clothing.

15. A system for reusing plastic hangers having size indicia removably mounted thereon as claimed in claim 1, wherein the statistically average hanger is reused from 2 to 6 times.

16. A system for reusing plastic hangers having size indicia removably mounted thereon as claimed in claim 1, further comprising means to clean and sort selected hangers, and means to package said selected hangers for shipment to said garment manufacturers.

\* \* \* \* \*